US012098061B2

(12) United States Patent
Hardin et al.

(10) Patent No.: US 12,098,061 B2
(45) Date of Patent: Sep. 24, 2024

(54) LIFTING DEVICE

(71) Applicant: Jungle Jim's Accessory Products, Inc., Louisville, KY (US)

(72) Inventors: Kris Hardin, Louisville, KY (US); James Thomas Hafendorfer, Louisville, KY (US)

(73) Assignee: JUNGLE JIM'S ACCESSORY PRODUCTS, INC., Louisville, KY (US)

( * ) Notice: Subject to any disclaimer, the term of this patent is extended or adjusted under 35 U.S.C. 154(b) by 541 days.

(21) Appl. No.: 17/509,166

(22) Filed: Oct. 25, 2021

(65) Prior Publication Data

US 2023/0129518 A1 Apr. 27, 2023

(51) Int. Cl.
*B66F 5/02* (2006.01)

(52) U.S. Cl.
CPC .................................... *B66F 5/02* (2013.01)

(58) Field of Classification Search
CPC ... B66F 5/02; B66F 15/00; Y10T 409/305824
USPC .............................. 254/133 R, 131, 134, 8 R
See application file for complete search history.

(56) References Cited

U.S. PATENT DOCUMENTS 2,521,266 A 9/1950 Swisher
2,605,999 A * 8/1952 Schultz .................... B66F 5/04 417/305
3,304,060 A 2/1967 Wanless et al.
3,381,953 A 5/1968 Miller
3,765,650 A * 10/1973 Eisenhauer .............. B66F 3/38 254/133 R
3,907,252 A * 9/1975 Gaarder .................... B66F 5/04 254/8 B
4,533,117 A 8/1985 Schwang
4,838,512 A 6/1989 Lisak et al.
5,292,107 A 3/1994 Chick
(Continued)

FOREIGN PATENT DOCUMENTS

FR 1330415 6/1963
GB 2101558 A 1/1983

OTHER PUBLICATIONS

Super Jack V2 Review; by: Douglas Lawn Care; found at: https://www.youtube.com/watch?v=QHSyppQFXCc (Year: 2023).*
(Continued)

*Primary Examiner* — Mahdi H Nejad
(74) *Attorney, Agent, or Firm* — Wyatt, Tarrant & Combs, LLP; Max E. Bridges; Matthew A. Williams

(57) ABSTRACT

A lifting device having an axle and a pair of wheels attached to the axle, a support element secured to the axle, a vertical element secured to the axle at an angle relative to the support element, and a handle secured to the distal end of the vertical element. In some embodiments, a safety arm is rotatably connected to the support element and the safety arm is moved from a closed position to an extended position, and vice versa, by simply rotating a handle grip which actuates a lever thereby moving a release pin from an engaged position to a dis-engaged position. The release pin secures the safety arm in the closed and extended positions. In further embodiments, a tooth is rotatably connected to the distal end of the support element and the tooth is biased inwards towards the lifting device by at least one spring.

15 Claims, 20 Drawing Sheets

(56) References Cited

U.S. PATENT DOCUMENTS

| | | | | | |
|---|---|---|---|---|---|
| 5,382,131 | A | | 1/1995 | Werthmann | |
| 5,678,804 | A | * | 10/1997 | Lintelman | B66F 15/00 254/133 R |
| 5,713,557 | A | * | 2/1998 | Kang | B66F 15/00 254/9 B |
| 7,926,386 | B1 | * | 4/2011 | Godfrey | B62K 21/16 74/551.3 |
| 9,676,599 | B1 | | 6/2017 | Baker | |
| 10,793,405 | B2 | * | 10/2020 | Tao | B66F 7/28 |
| 2009/0121203 | A1 | * | 5/2009 | Martini | B66F 15/00 254/131 |
| 2015/0034890 | A1 | * | 2/2015 | Arner | B66F 3/12 254/133 R |

OTHER PUBLICATIONS

Jungle Jack V2 Update Sep. 26, 2023; by: JungleJimsAP; found at: https://www.youtube.com/watch?v=FdicKrieRnE (Year: 2023).*

Jungle Jack; by: JungleJimsAP; found at: https://www.youtube.com/watch?v=NrfRFtnjwCA (Year: 2016).*

Jungle Jack Instruction (by: JungleJimsAP; Published on Mar. 30, 2020 https://www.youtube.com/watch?v=phhdppjLxOA (Year: 2020).*

The United States Patent and Trademark Office; Invitation to Pay Fees and, Where Applicable, Protest Fee for PCT/US/47665; Jan. 13, 2023, pp. 1-2, USA.

JUNGLEJIMSAP. "Jungle Jack Instruction Revised Mar. 27, 2020" [online]. Mar. 27, 2020; pp. 1-4; [Retrieved on Jan. 9, 2023]. Retrieved from the internet: <URL: https://www.youtube.com/watch?v=phhdppjLxOA>.

JUNGLEJIMSAP. "Jungle Jack V2 Assembly" [online]. Jul. 26, 2022; pp. 1-4; [Retrieved on Jan. 9, 2023]. Retrieved from the internet: <URI: https://www.youtube.com/watch?v=fYBRh4W4tclo>.

The United States Patent and Trademark Office (As Receiving Office); Notification of Transmittal of the International Search Report and The Written Opinion of the International Searching Authority, or the Declaration; International Search Report and Written Opinion for PCT/US22/47665; Mar. 17, 2023; pp. 1-16; The United States Patent and Trademark Office as Receiving Office; US.

Ballard; Super Jack V2; Advertisement; 2021; pp. 1-4; https://www.ballard-inc.com/product/super-jack-v2/; Ballard Inc.; USA.

* cited by examiner

LIFTING DEVICE

FIELD OF INVENTION

The embodiments described herein relate to devices for lifting or jacking equipment, such as lawn mowing equipment.

BACKGROUND

To perform maintenance or service tasks on large lawn mowing equipment, such as replacing belts, repairing and/or replacing blades, fixing flat tires, and so forth, it is often necessary to lift or jack the lawn mowing equipment in order to access its underside.

However, conventional lifting devices for lawn mowing equipment present a number of disadvantages. For example, the jacking device disclosed in U.S. Pat. No. 5,678,804, the contents of which are fully incorporated herein by reference, generally discloses a safety arm for supporting the jacking device after the lawn mowing equipment has been lifted. However, the user can only release this safety arm by reaching underneath the mower (after it has been lifted) and manually rotating and removing a pin. This places the user in a precarious position beneath a heavy piece of machinery that has not yet been fully secured by the safety arm.

Some conventional lifting devices also include a tooth or gripping jaw for contacting and lifting the lower edge of the lawn mowing equipment (e.g. the mower deck). However, in these conventional lifting devices, it is difficult to position the tooth in a neutral position such that is ready to receive the lower edge of the mowing equipment for lifting.

Accordingly, there is a significant need for a lifting device which automates the release of the safety arm and which presents the tooth or gripping jaw in a neutral position when addressing the mower for lifting. Along with other features and advantages outlined herein, the lifting device according to multiple embodiments and alternatives meet these and other needs. In doing so, the lifting device is safer and easier to use than conventional devices.

SUMMARY OF EMBODIMENTS

According to multiple embodiments and alternatives, the lifting device comprises an axle and a pair of wheels, a support element secured to the axle, a vertical element secured to the axle at an angle relative to the support element, an optional handle extension in which one end is secured to the vertical element and the other end has a pair of handle grips, and a brace element running from the support element to the vertical element. In some embodiments, the angle between the support element and the vertical element is between about 60° to 90°, and In further embodiments the angle is between about 60° to 70°. In some embodiments, a foot assist bar is rotatably connected to the vertical element to assist the user in lifting the lawn mowing equipment. In further embodiments, the vertical element extends further upwards and receives the pair of handle grips.

According to multiple embodiments and alternatives, the lifting device comprises a safety arm rotatably connected to the lower section of the support element. In some embodiments, the safety arm has a release pin which is actuated by a lever on one of the handle grips. In further embodiments, the pin is mechanically connected to the handle by a cable, and rotation of one of the handle grips by a user causes the pin to pull inward and disengage from the safety arm, thereby causing the safety arm to rotate downward and engage the floor or ground surface. In the alternative to a rotating handle grip, in some embodiments the pin is actuated by a mechanism located on the handle that is similar to a bike hand brake lever or a lever gear shift wherein a user can pull on the lever. Alternatively, the pin is actuated by other manual mechanisms, via an electrical mechanism, an electronic motor, and/or other methods known to one of ordinary skill in the art. It will be appreciated that the safety arm provides further support and stability to the lifting device while it is lifting up a piece of lawn mowing equipment, and a user can automatically actuate the safety arm by simply rotating one of the handle grips.

In some embodiments, a tooth is rotatably connected to the distal end of the support element and the tooth is biased inwards towards the lifting device by one or more springs. Accordingly, the spring(s) permits the tooth to remain in a neutral position and properly engage a lower edge of the lawn mowing equipment when a user is ready for lifting.

Compared to conventional lifting or jacking devices, the lifting device according to multiple embodiments and alternatives is safer and easier to use. Accordingly, the lifting device provides a number of advantages over conventional lifting devices, along with other features disclosed herein.

BRIEF DESCRIPTION OF THE FIGURES

The drawings and embodiments described herein are illustrative of multiple alternative structures, aspects, and features of the present embodiments, and they are not to be understood as limiting the scope of present embodiments. It will be further understood that the drawing Figures described and provided herein are not to scale, and that the embodiments are not limited to the precise arrangements and instrumentalities shown. In some of the drawing Figures, a dashed line is shown to illustrate a cable or other internal structures located inside the device.

MULTIPLE EMBODIMENTS AND ALTERNATIVES

Figure 1:
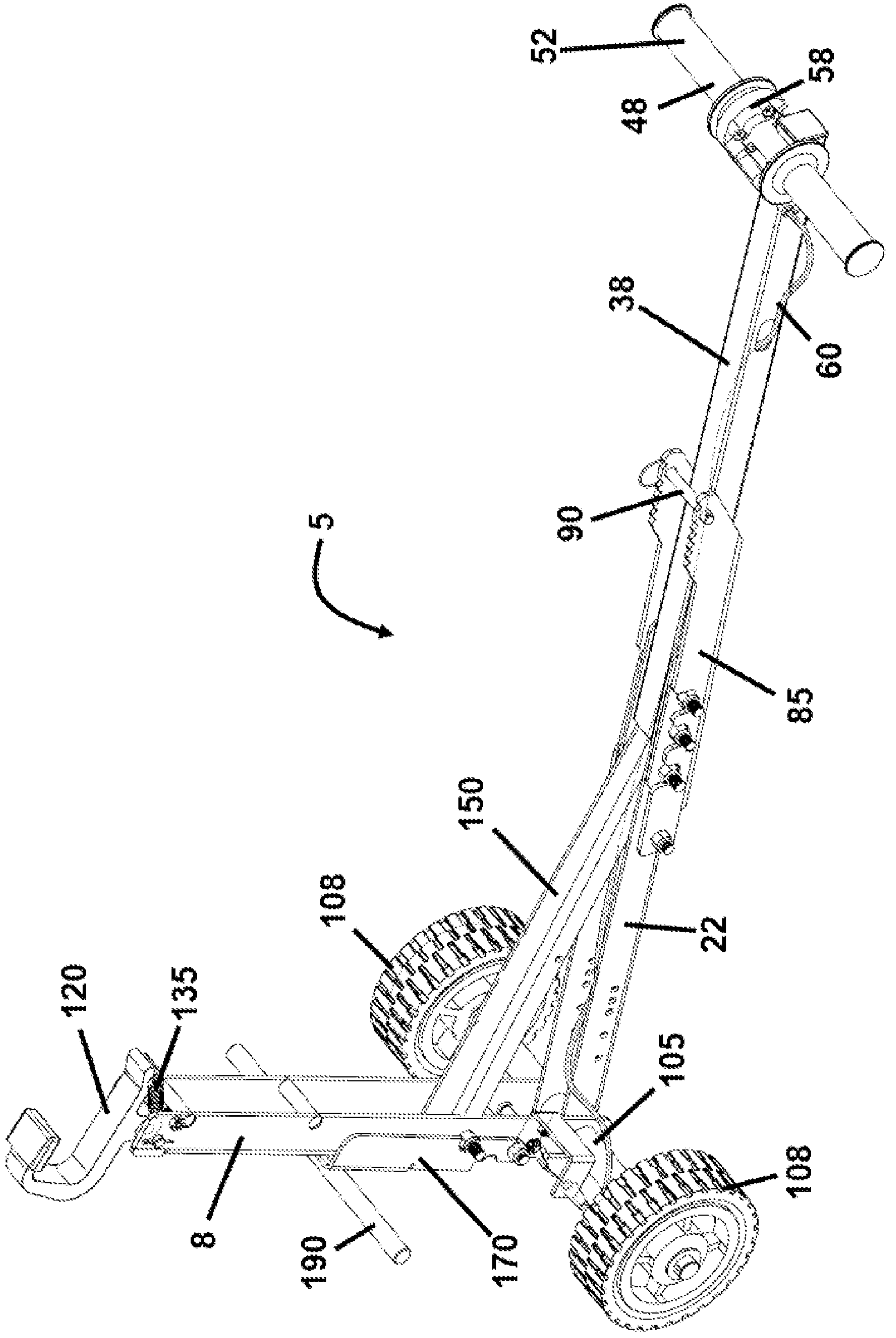
FIG. 1 is a perspective view of a lifting device, according to multiple embodiments and alternatives.

FIG. 1 illustrates lifting device 5 comprising an axle 105 and a pair of wheels 108 positioned on the ends of the axle 105, the first end 10 of a support element 8 secured to the axle 105, the first end 25 of a vertical element 22 secured to the axle 105 at an angle relative to the support element 8, and a brace element 150 spanning between the support element 8 and the vertical element 22. A safety arm 170, having a bar 190 attached to its distal end 182, is rotatably connected to a lower section 15 of support element 8 and the safety arm 170 mates with the external surface 16 of support element 8. A foot assist bar 85 is rotatably connected near a distal end 28 of the vertical element 22. In some embodiments, a user must first remove safety pin 90 to rotate foot assist bar 85 away from lifting device 5. In further embodiments, the length of the vertical element 22 can be adjusted by the user.

In some embodiments, the lifting device 5 further comprises an optional handle extension 38 which extends from, and is secured to, the vertical element 22. In some embodiments, the length of the handle extension 38 can be adjusted by the user. A handle 48 with a lever 58 is attached to an inside surface 40 of the handle extension 38. As discussed in more detail below, the lever 58 is mechanically connected to both a rotating handle grip 52 and a release pin 78 by a cable 60. When a user rotates handle grip 52, this movement actuates cable 60 and causes release pin 78 to move inwards from an engaged position and to a dis-engaged position, thereby causing safety arm 170 to rotate downwards and engage the ground. In further embodiments, there is no handle extension and the vertical element 22 extends further upwards to receive the handle 48, the lever 58, and cable 60.

As shown in FIG. 1, a tooth 120 is rotatably connected to the distal end 12 of support element 8. In some embodiments, a pair of springs 135 connect the tooth 120 to support element 8. When the tooth is rotated outwards, the pair of springs 135 apply a force which biases the tooth 120 inwards towards lifting device 5. Accordingly, the pair of springs 135 position the tooth in a proper position to engage a piece of lawn mowing equipment when the user is ready for lifting.

Figure 2:
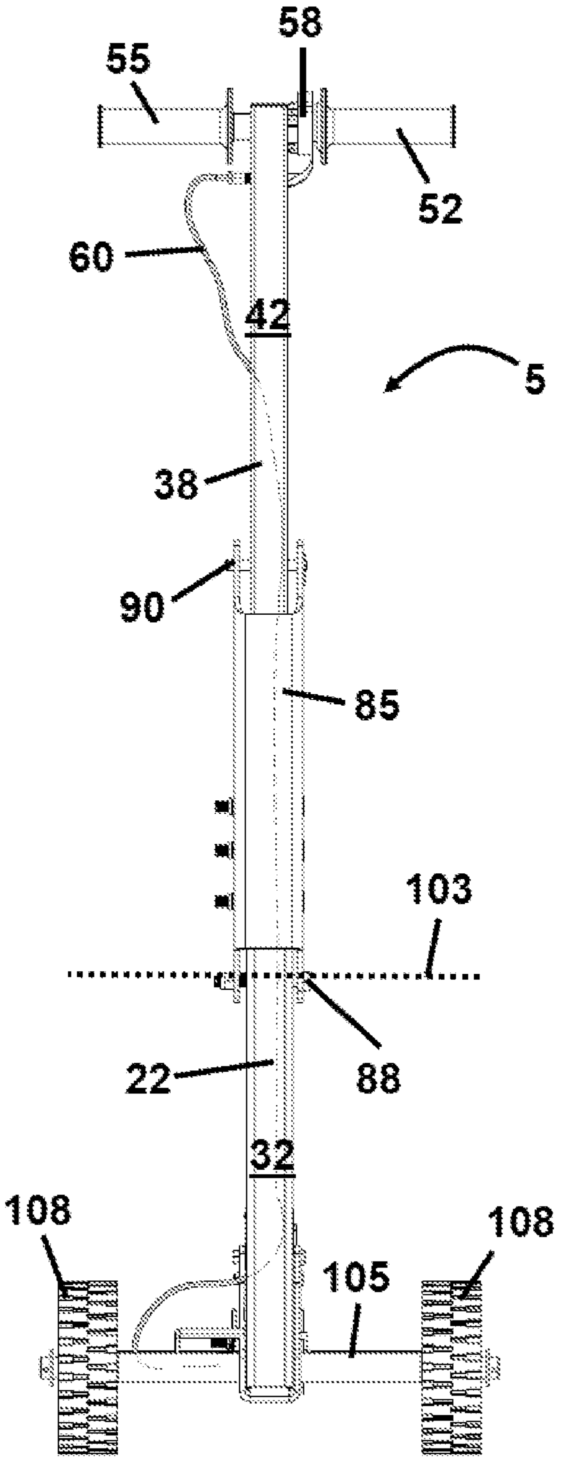
FIG. 2 is a front view of a lifting device in a vertical position, according to multiple embodiments and alternatives.
Figure 3A:
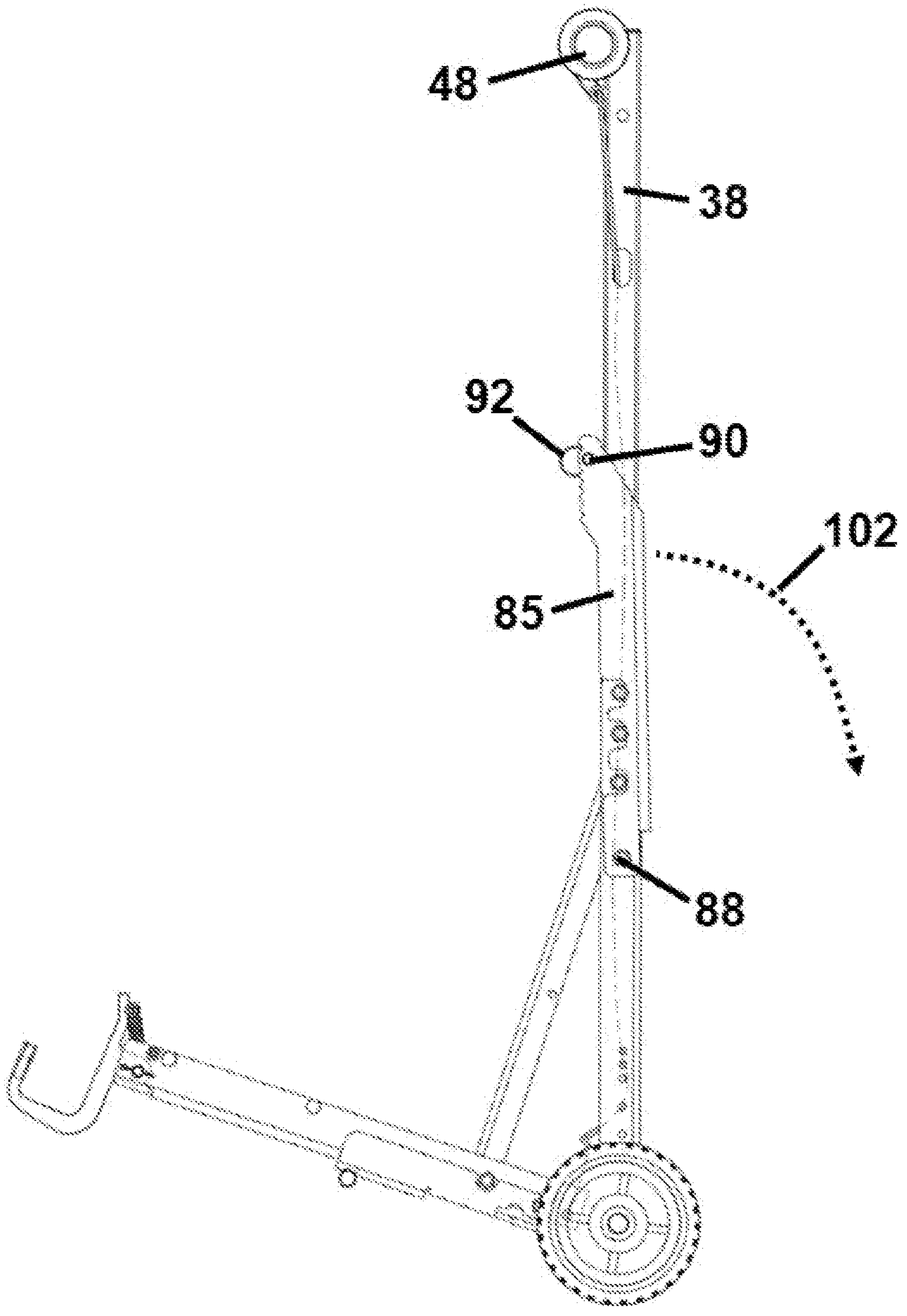
FIG. 3A is a side view of a lifting device in a vertical position, according to multiple embodiments and alternatives.
Figure 3B:
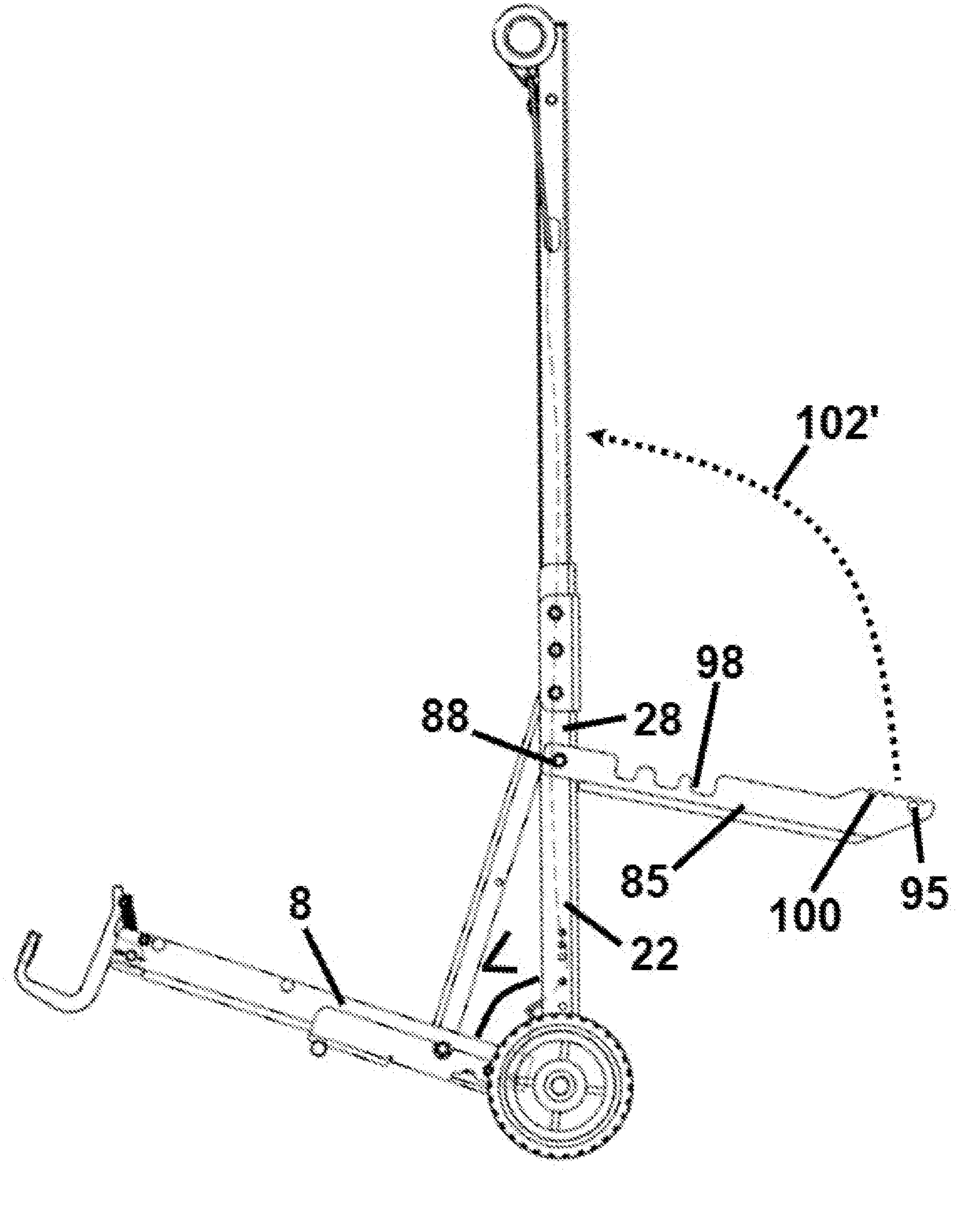
FIG. 3B is a side view of a lifting device in a vertical position with an extended foot assist bar, according to multiple embodiments and alternatives.

FIGS. 2-3B illustrate lifting device 5 in the vertical position. In this position, the vertical element 22 generally extends vertically. When in the vertical position, a user can easily move lifting device 5 by gripping handle 48 and moving the device 5 using the pair of wheels 108. In this vertical position, the lifting device 5 can also be easily stored. As shown most clearly in FIG. 1, handle extension 38, vertical element 22, brace element 150, and support element 8 can be secured to one another by any manner known to one of skill in the art, such as welding, nuts and bolts, etc. As shown in FIG. 2, handle 48 comprises static handle grip 55 and rotating handle grip 52. When a user rotates handle grip 52, this movement actuates lever 58 which in turn causes cable 60 to move release pin 78 from the engaged position (best illustrated in FIGS. 7A and 8A) to the dis-engaged position (best illustrated in FIGS. 7B and 8B). Cable 60 spans the length of handle extension 38 and vertical element 22, and in some embodiments, a portion of cable 60 is positioned inside both handle extension 38 and the vertical element 22.

FIG. 2 illustrates the outside surface 42 of handle extension 38 and the outside surface 32 of vertical element 22. In some embodiments, the foot assist bar 85 is rotatably connected adjacent to the distal end 28 of vertical element 22 and rotates about bolt 88 (also referred to as a hinge herein). A certain length of foot assist bar 85 mates with both the outside surface 42 of handle extension 38 and the outside surface 32 of vertical element 22. While not illustrated, in some embodiments the degree of rotation of foot assist bar 85 is limited by a stop bar.

To rotate foot assist bar 85 to an extended position (best illustrated in FIG. 3B), in some embodiments a user first removes safety pin 90. In further embodiments, a user first removes a loop 92 from an end of safety pin 90, and then removes safety pin 90 from the distal end of foot assist bar 85. Then a user can rotate foot assist bar 85 about bolt 88. For example, external rotation is denoted by arrow 102 (shown in FIG. 3A) and internal rotation is denoted by arrow 102' (shown in FIG. 3B). In this regard, external rotation is associated with extending (or opening) foot assist bar 85 and internal rotation is associated with closing foot assist bar 85. Bolt 88 serves as a pivot for foot assist bar 85 to rotate externally and internally, and bolt 88 defines foot assist bar axis 103 (illustrated in FIG. 2). Herein the term "axis" refers to an imaginary line about which rotation occurs. For example, foot assist bar 85 rotates about foot assist bar axis 103.

As shown in FIG. 3B, foot assist bar 85 further comprises a plurality of grooves 98 which receive the nuts and bolts that secure the brace element 150 to the vertical element 22, and the vertical element 22 to the handle extension 38. Foot assist bar 85 also comprises a pin receiving bore 95 to receive safety pin 90 and a plurality of notches 100 which receive the foot of a user. It will be appreciated that the foot assist bar 85 assists the user in raising the lawn mowing equipment. For example, a user can apply pressure to an extended foot assist bar 85 to provide additional force to raise the lawn mowing equipment upwards. This downward force is transferred to vertical element 22, thus providing additional assistance in the raising of heavy lawn mowing equipment.

Both support element 8 and vertical element 22 are securely attached to axle 105 by any means known to one of ordinary skill in the art (e.g. welding as a non-limiting example). As shown in FIG. 3B, vertical element 22 is positioned at an angle relative to support element 8 (denoted by the symbol "∠" in FIG. 3B) and in some embodiments, this angle is between about 60° to 90°.

To lift or jack the lawn mowing equipment, a user first positions the lifting device 5 in the vertical position (shown in FIG. 3A), then extends tooth 120 until it engages a bottom edge of the lawn mowing equipment. The pair of springs 135 bias the tooth 120 inwards towards the lifting device 5 and position the tooth 120 in the proper position to engage the lawn mowing equipment. A user then rotates lifting device 5 downwards until it is in the horizontal position illustrated in FIG. 4A and the lawn mowing equipment is jacked upwards. In this horizontal position, the vertical element 22 and the handle extension 38 generally extend horizontally. As previously noted, a user can utilize the foot assist bar 85 to apply additional force to raise the lawn mowing equipment. Once lifting device 5 is in the horizontal position, tooth 120 is engaged with the lawn mowing equipment and the weight of the lawn mowing equipment holds tooth 120 in a position against the bias applied by the pair of springs 135 (see FIGS. 4A-4B).

Figure 4A:
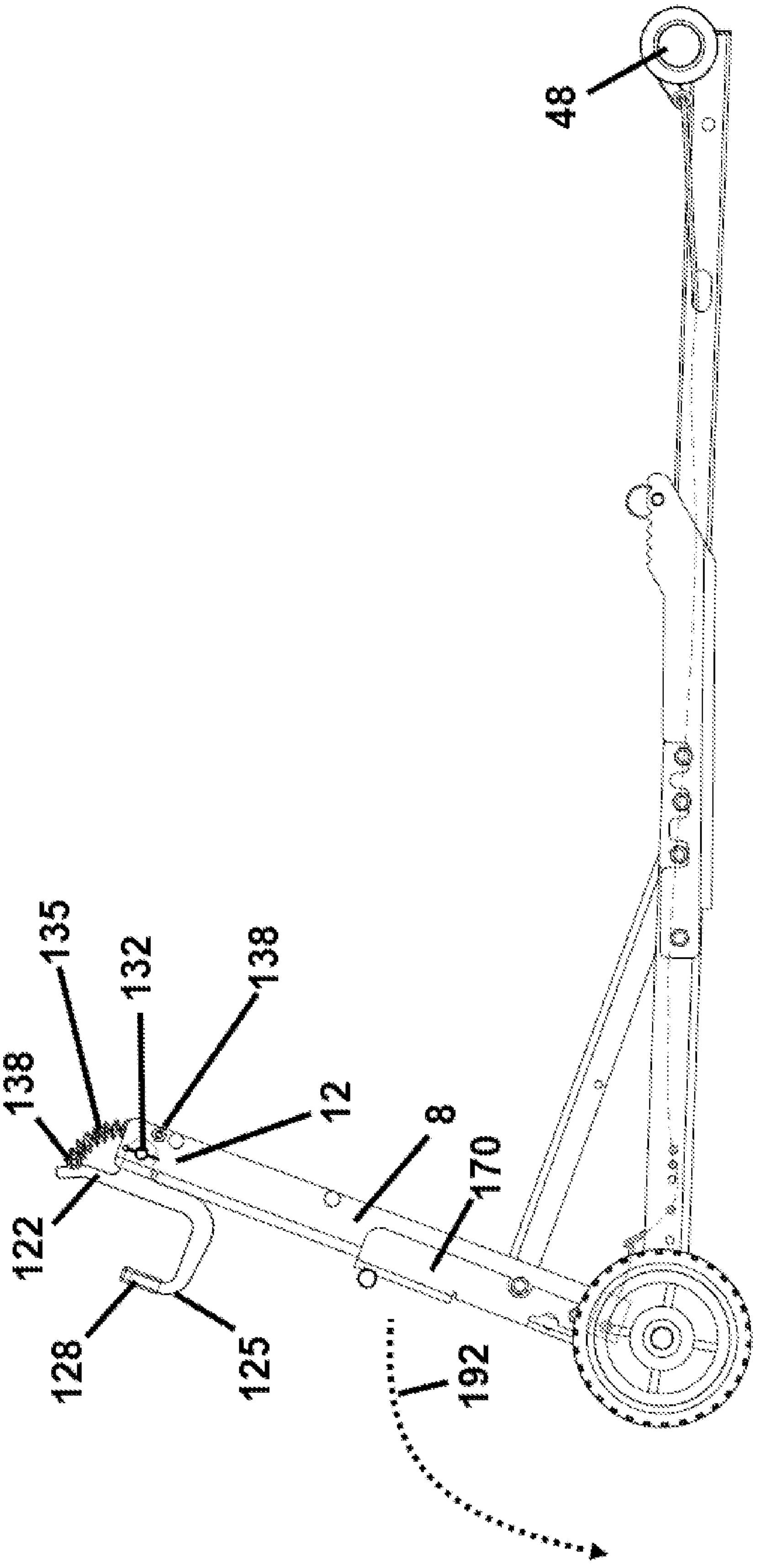
FIG. 4A is a side view of a lifting device in a horizontal position, according to multiple embodiments and alternatives.
Figure 4B:
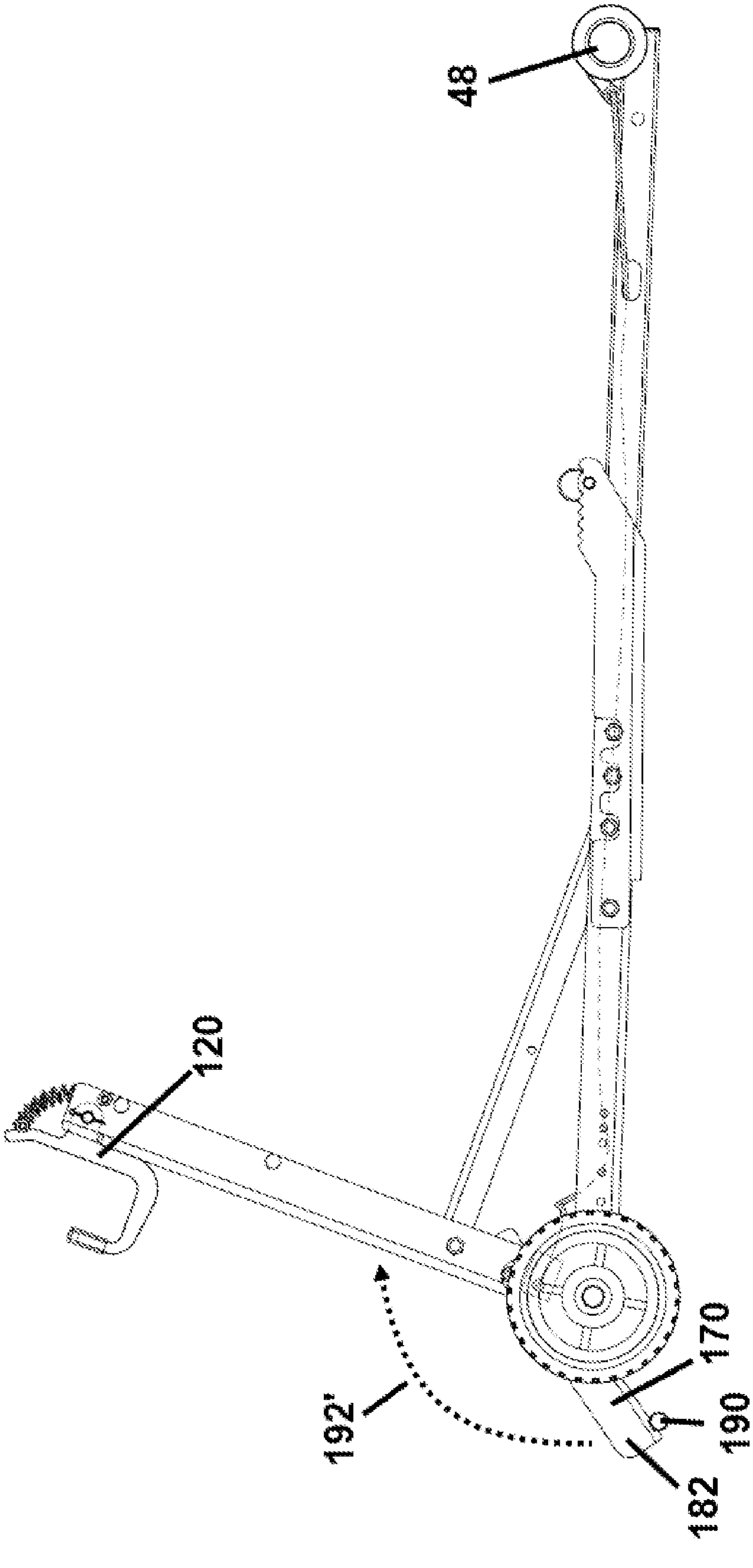
FIG. 4B is a side view of a lifting device in a horizontal position with an extended safety arm, according to multiple embodiments and alternatives

As shown in FIG. 4A, according to multiple embodiments and alternatives, the tooth 120 is generally in the shape of the letter "J" and comprises an upper end 122 comprising an extension and a lower end 125 which comprises a rounded element integrally connected to the extension of the upper end 122. The inner surface of the lower end 125 is adapted to receive a piece of lawn mowing equipment. The lower end 125 receives a pad 128 and the upper end 122 is rotatably connected to the distal end 12 of support element 8 about bolt 132 (also referred to herein as a hinge). Accordingly, bolt 132 defines a tooth axis 140, and the tooth 120 rotates about tooth axis 140 (illustrated in FIG. 13).

In some embodiments, the outside surface of the upper end 122 forms a protrusion which defines a bolt receiving bore 130 (not illustrated) that receives bolt 132. In further embodiments, a bolt 138 is connected to the upper end 122 of tooth 120. Bolt 138 is connected to the pair of springs 135 which are also connected to another bolt 138 located within the distal end 12 of support element 8.

Figure 12A:
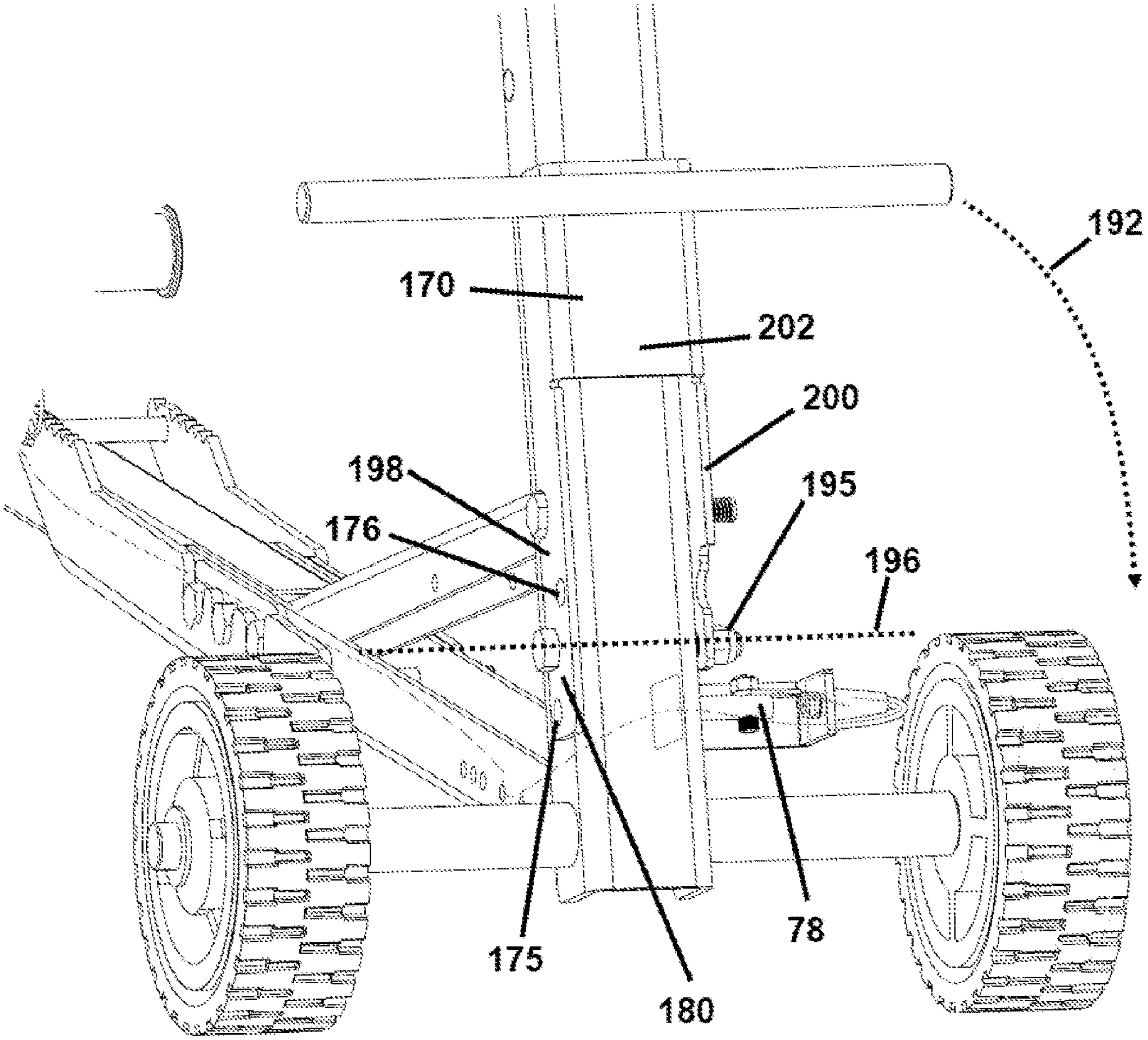
FIG. 12A is a front, perspective view of a lifting device, according to multiple embodiments and alternatives.
Figure 12B:
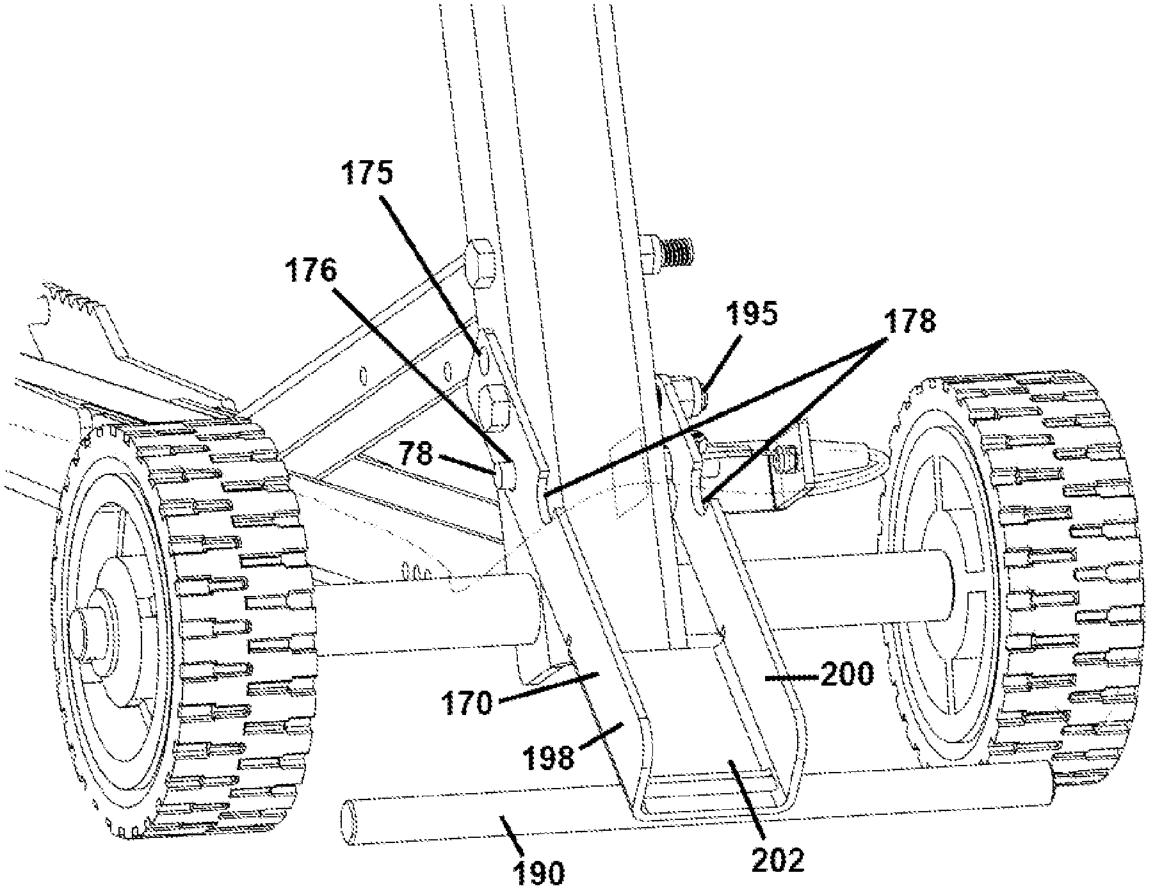
FIG. 12B is a front, perspective view of a lifting device with an extended safety arm in a secured position, according to multiple embodiments and alternatives.

To maintain the lifting device 5 in a fixed position after the lawn mowing equipment has been lifted, a user can extend the safety arm 170. In this manner, external rotation (i.e. to the extended position) is denoted by the arrow 192 in FIG. 4A and internal rotation (i.e. to the closed position) is denoted by the arrow 192' in FIG. 4B. Once in the extended position, the bar 190 of the safety arm 170 engages the ground surface and provides added stability to lifting device 5. As best illustrated in FIGS. 12A-12B, safety arm 170 is rotatably connected to a lower section 15 of support element 8 about bolt 195 (also referred to herein as a hinge). As such, bolt 195 defines safety arm axis 196 (illustrated in FIG. 12A), and safety arm 170 rotates about safety arm axis 196 to and from the closed and extended positions.

Figure 5:
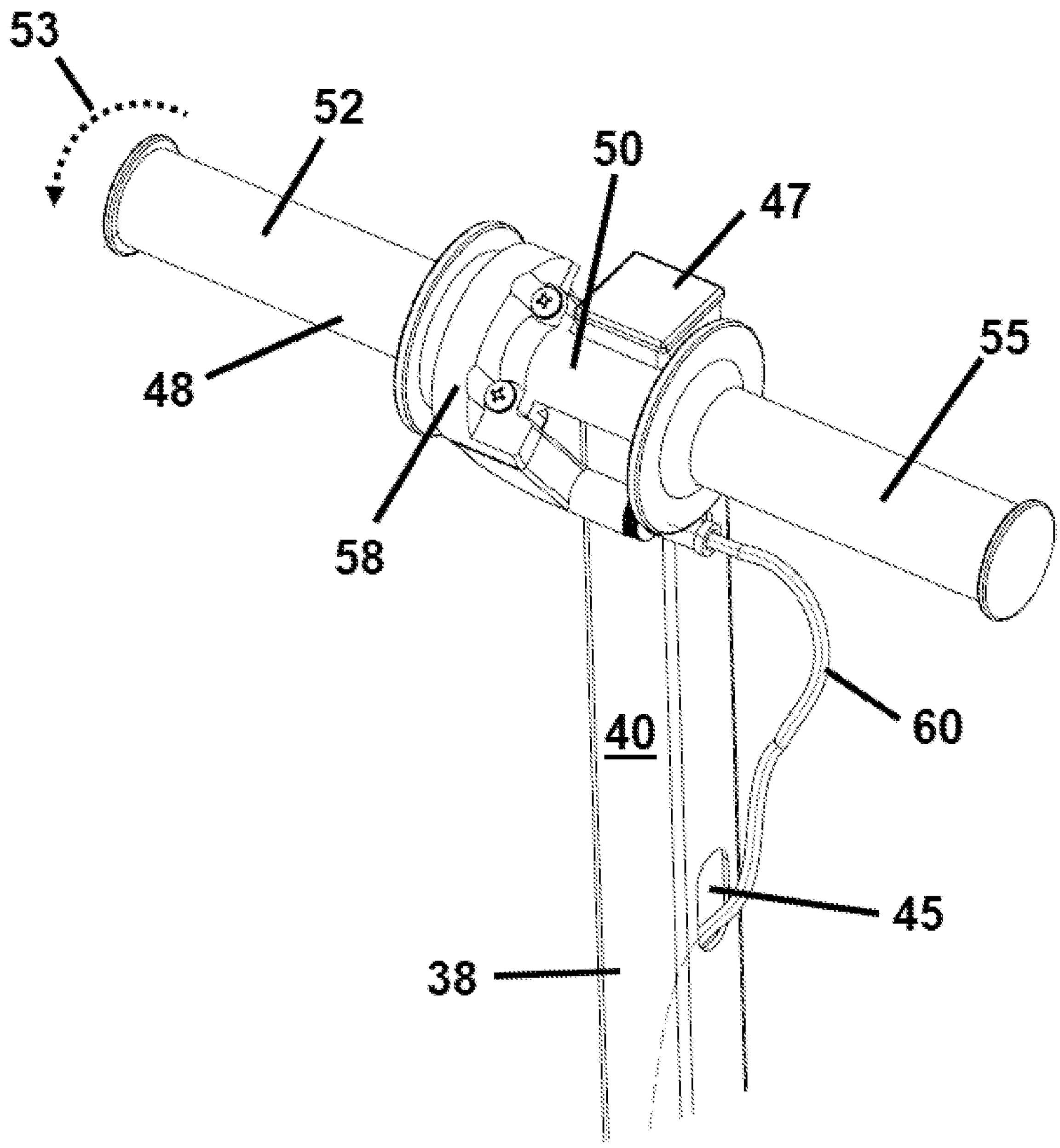
FIG. 5 is a close-up view of a handle and a lever, according to multiple embodiments and alternatives.

FIG. 5 illustrates handle 48 securely attached to the distal end 47 and inside surface 40 of handle extension 38. In some embodiments, handle 48 further comprises a handle bar 50 which receives rotating handle grip 52 and static handle grip 55. The static handle grip 55 remains in a fixed position about handle bar 50, and rotating handle grip 52 is rotatably connected about handle bar 50 such that it can be moved outwardly by the user along arrow 53. In further embodiments, rotating handle grip 52 rotates inwardly, or both directions. Rotating handle grip 52 is mechanically connected to lever 58, which in turn is connected to cable 60. As shown in FIG. 5, in some embodiments handle extension 38 defines one or more bores 45 to receive cable 60 within its hollow interior. Cable 60 then spans the length of handle extension 38 and vertical element 22 until it reaches member 62 positioned adjacent to axle 105. In some embodiments, there is no handle extension 38, and the vertical element 22 simply extends further upwards to receive handle 48 and the other components illustrated in FIG. 5.

As shown in FIGS. 7A to 8B, support element 8 comprises a pair of opposing side walls 19, each having an external surface 16 and an internal surface 17. As illustrated in FIGS. 6-10, a member 62 is secured to an internal surface 17 of one of the side walls 19 in the lower section 15 of support element 8. Member 62 defines a cable guide bore 65 and a pin bore 68 positioned adjacent to the internal surface 17 of one of the opposing side walls 19. In some embodiments, a first cable guide 70 receives cable 60 on an outside surface of member 62 and first cable guide 70 passes through cable guide bore 65. Within one of the walls of member 62 and an opposing side wall 19 of the support element 8, the cable 60 is received by a second cable guide 72. Cable clamp 75 then securely attaches the cable 60 to both the second cable guide 72 and to the release pin 78.

Figure 6:
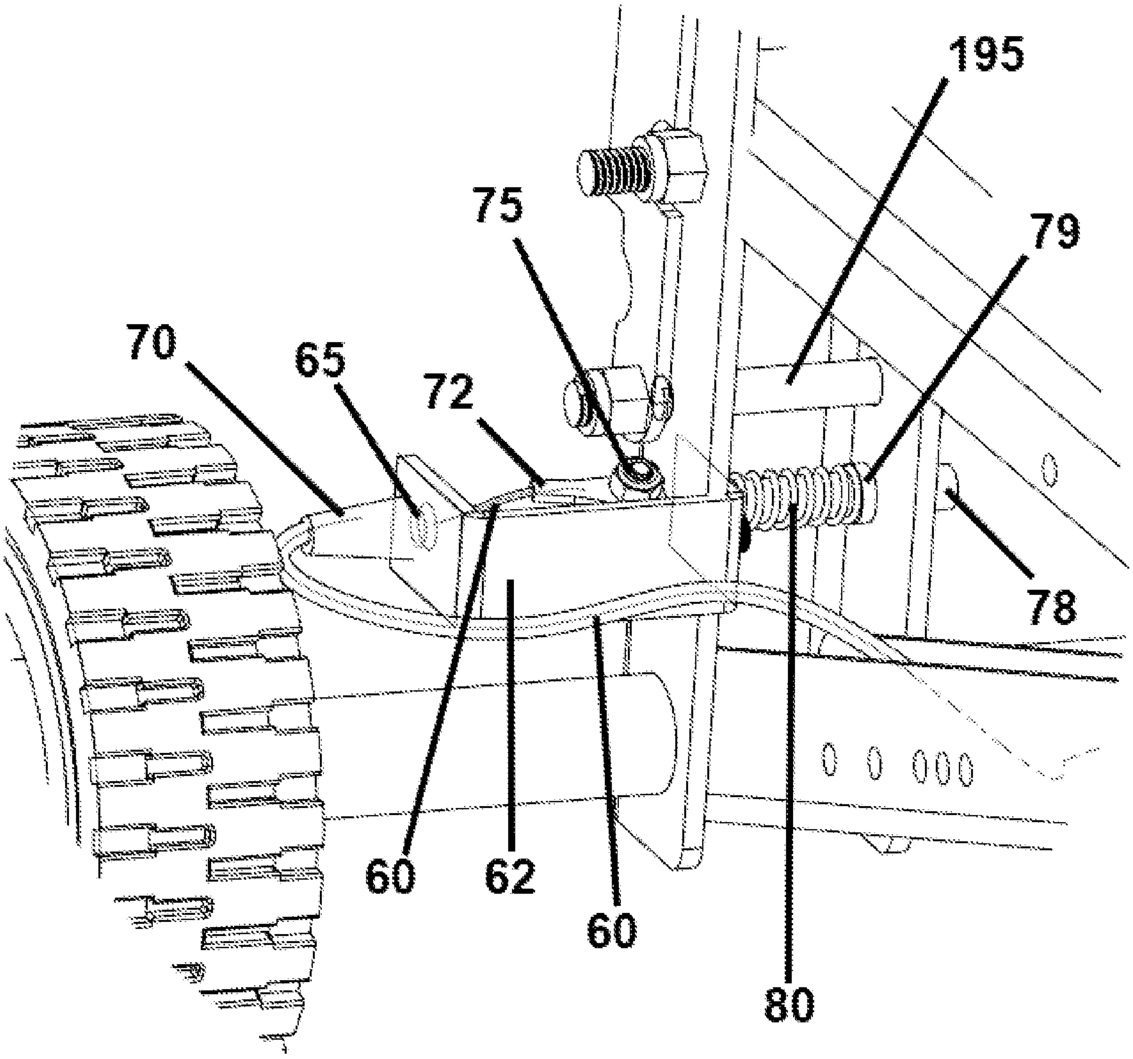
FIG. 6 is a close-up view of a release pin in an engaged position, according to multiple embodiments and alternatives.

Support element 8 comprises a pair of opposing side walls 19, wherein each side wall 19 comprises an external surface 16 and an internal surface 17. Each of the pair of opposing side walls 19 define a release pin receiving bore 20 positioned parallel to the cable guide bore 65 and pin bore 68 of the member 62. Release pin 78 spans from one of the release pin receiving bores 20 defined by one of the sides wall 19, through the pin bore 68 defined by the member 62, through the other release pin receiving bore 20 defined by the opposing side wall 19, and then through a first release pin receiving bore 175 defined by safety arm 170 (best illustrated in FIGS. 8A and 8B. Spring 80 is positioned about release pin 78 and is engaged with one of the opposing walls of member 62 and shoulder 79 (which is formed by release pin 78). During movement of the release pin 78 inward from the engaged position (best illustrated in FIGS. 7A and 8A) to the dis-engaged position (best illustrated in FIGS. 7B and 8B), the spring 80 compresses against one of the opposing walls of member 62 and applies a force against shoulder 79 which biases release pin 78 towards engagement with the safety arm 170. FIGS. 6, 8A, and 8B best illustrate the compression of spring 80 when the release pin 78 is pulled inwards towards the disengaged position.

Figure 7A:
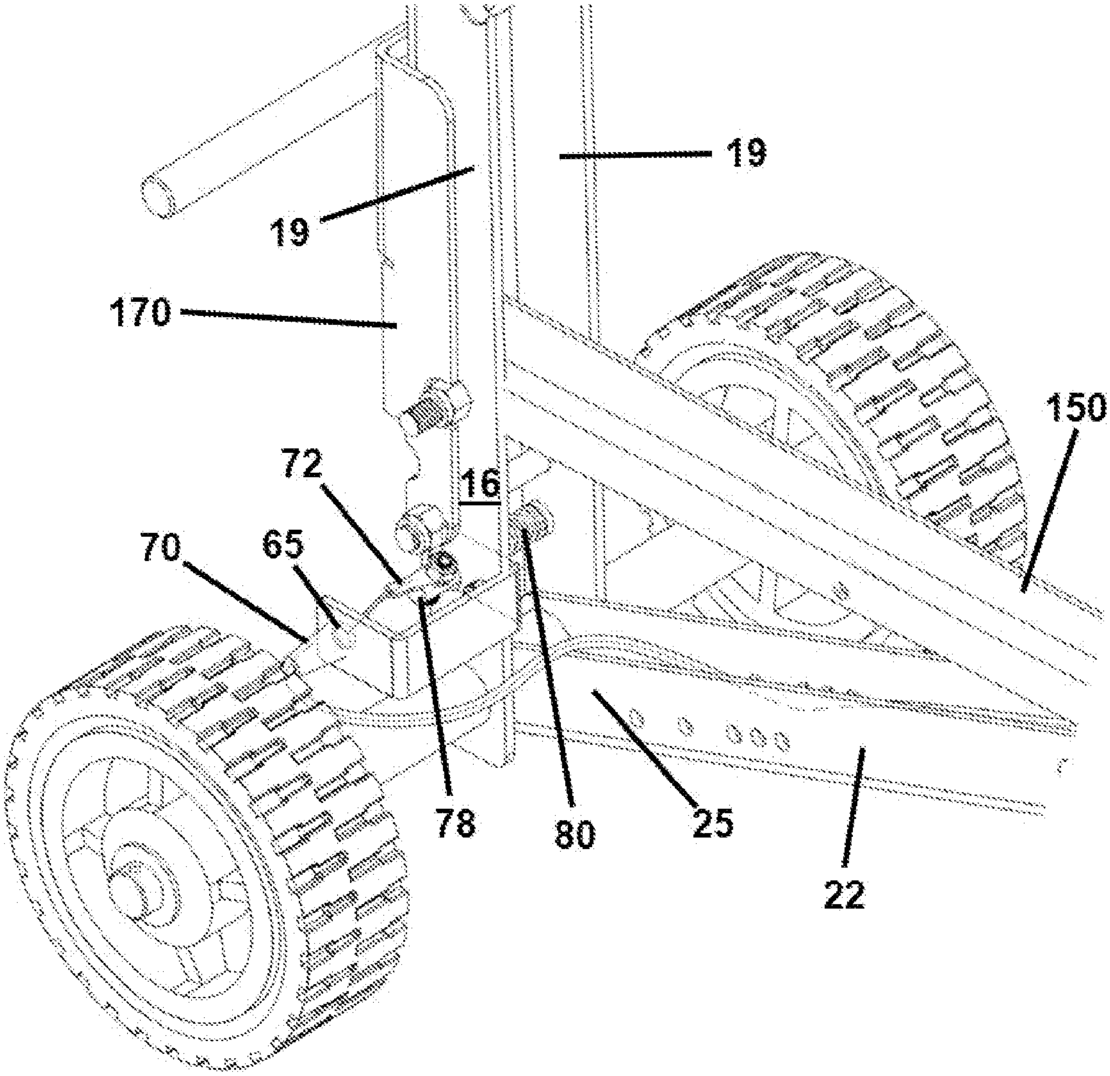
FIG. 7A is a perspective view of an axle and wheels, and a release pin in an engaged position, according to multiple embodiments and alternatives.
Figure 7B:
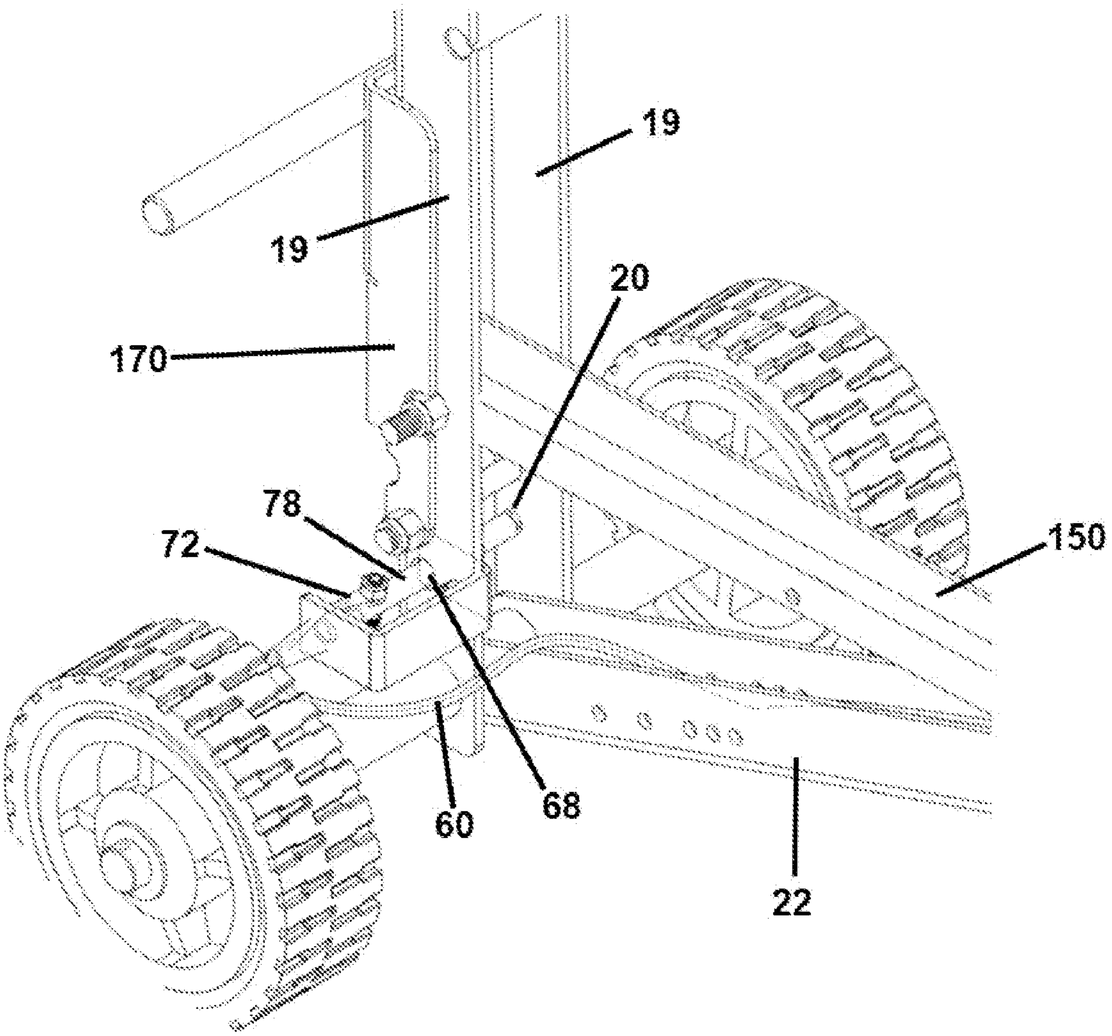
FIG. 7B is a perspective view of an axle and wheels, and a release pin in a dis-engaged position, according to multiple embodiments and alternatives.
Figure 8A:
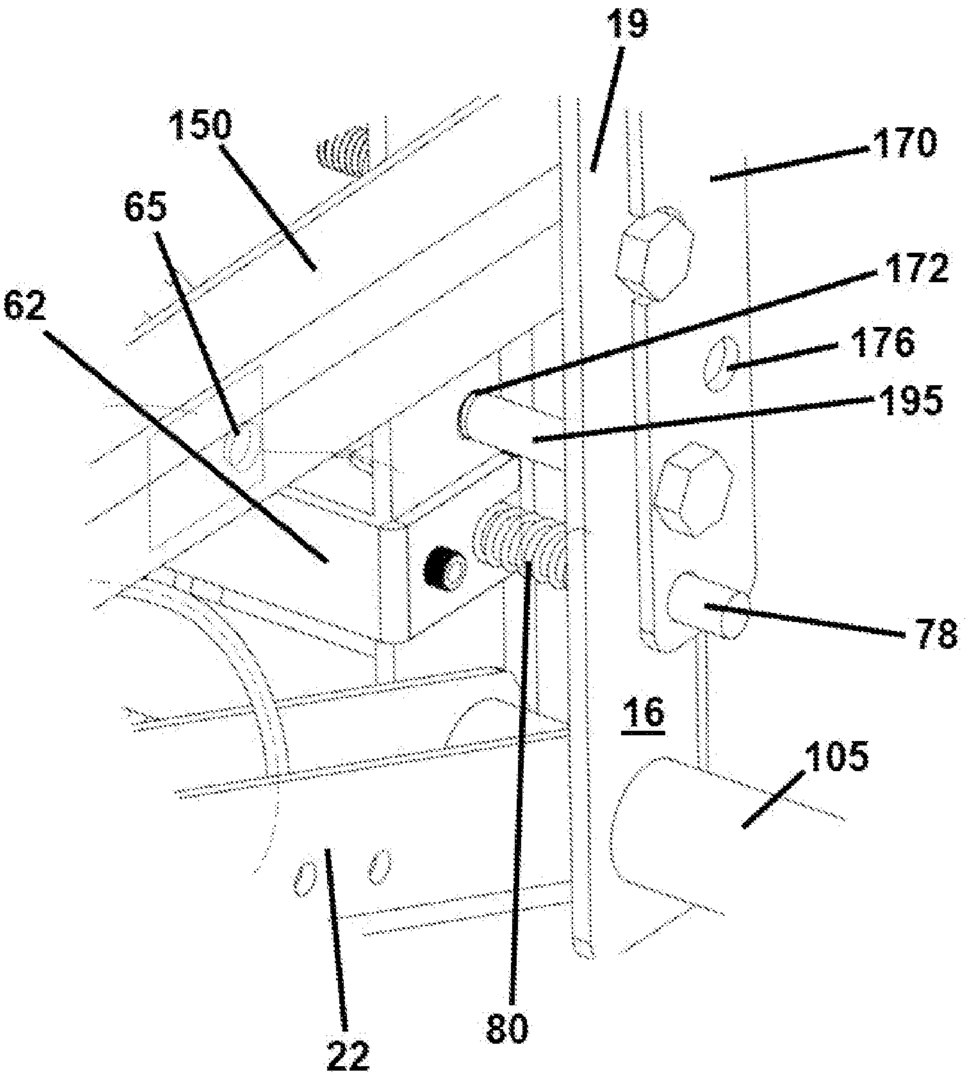
FIG. 8A is a close-up view of a release pin in an engaged position, according to multiple embodiments and alternatives.
Figure 8B:
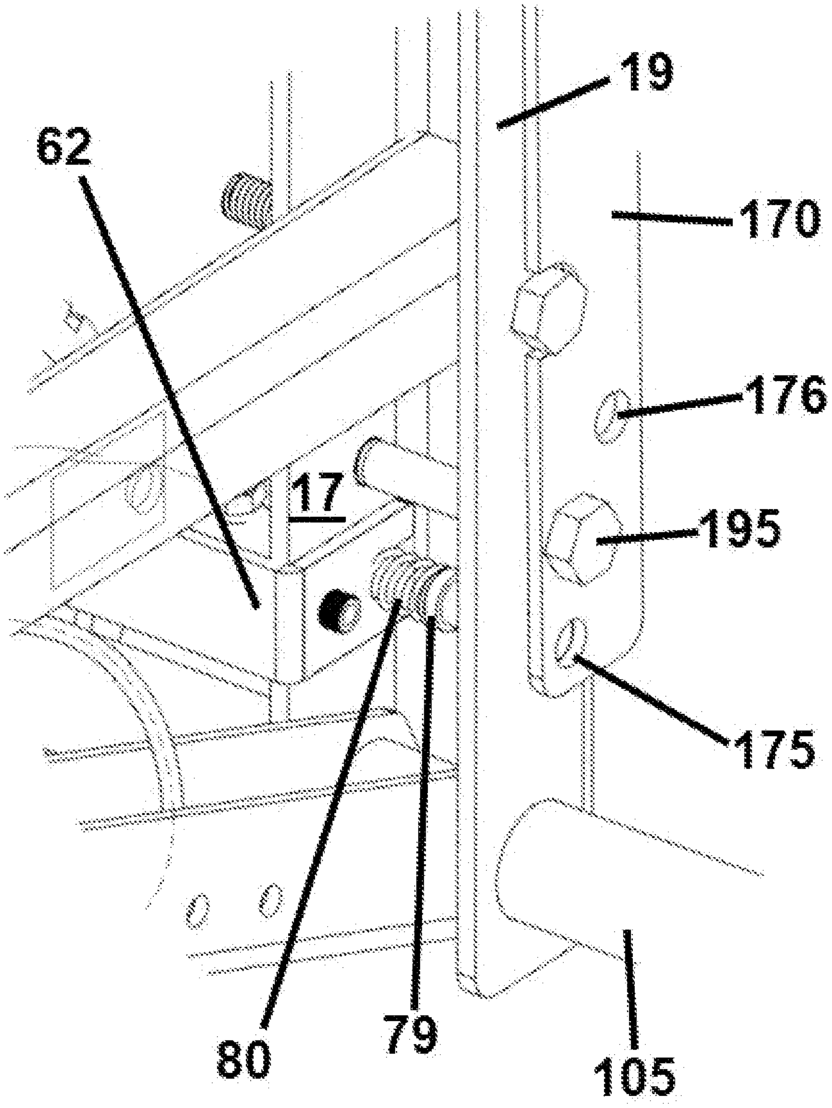
FIG. 8B is a close-up view of a release pin in a dis-engaged position, according to multiple embodiments and alternatives.

FIGS. 7A and 8A illustrate release pin 78 in the engaged position, and FIGS. 7B and 8B illustrate release pin 78 in the dis-engaged position. In the engaged position, release pin 78 spans through both release pin receiving bores 20 of the opposing side walls 19, through pin bore 68 defined by the member 62, and through the first release pin receiving bore 175 of safety arm 170. When a user actuates rotating handle grip 52, this causes lever 58 to pull cable 60, which in turn pulls release pin 78 inwards such that it is no longer engaged with the first release pin receiving bore 175 of safety arm 170 (see FIG. 8B). Once in the disengaged position, safety arm 170 then rotates downward and contacts the floor.

Figure 9:
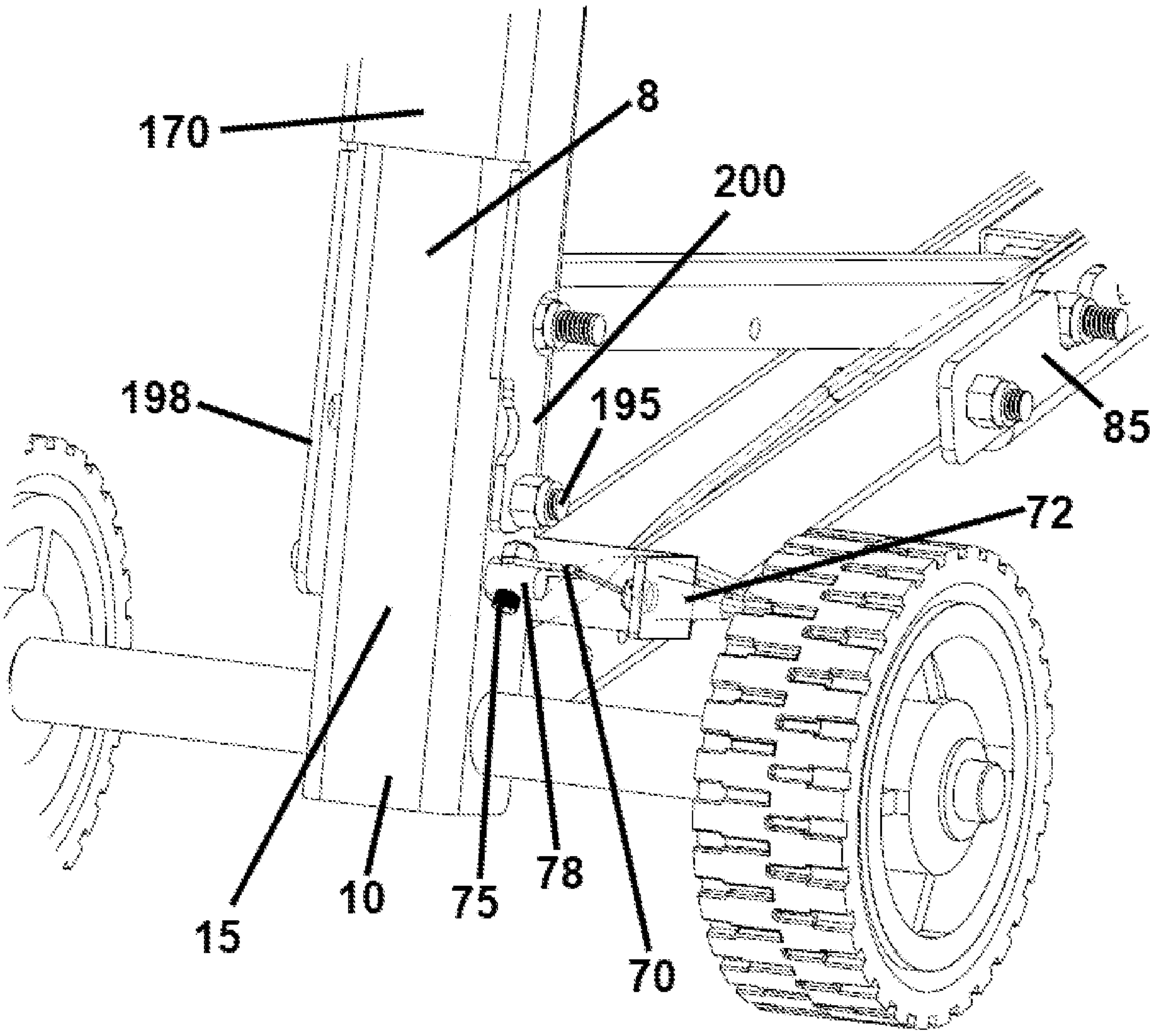
FIG. 9 is a front, perspective view of a lifting device, according to multiple embodiments and alternatives.

In some embodiments, safety arm 170 is rotatably attached to the lower section 15 of support element 8. In this manner, safety arm 170 rotates about safety arm axis 195 (illustrated in FIG. 12A), which is defined by bolt 195. As illustrated in FIG. 9, the safety arm 170 comprises a first side wall 198 and a second side wall 200, wherein both walls 198, 200 define a bolt receiving bore 172 to receive bolt 195. In FIG. 9, first side wall 198 is a longer length than second side wall 200, and only first side wall 198 defines the first release pin receiving bore 175. The length of second side wall 200 stops short of, and does not engage with, release pin 78. As shown in FIGS. 8A-8B and FIGS. 12A-12D, first side wall 198 further defines a second release pin receiving bore 176, which is positioned distal and more outward relative to the first release pin receiving bore 175. When safety arm 170 engages the floor surface, the biasing force applied by spring 80 causes the release pin 78 to be received within the second release pin receiving bore 176 and secures safety arm 170 in the extended position.

Figure 10:
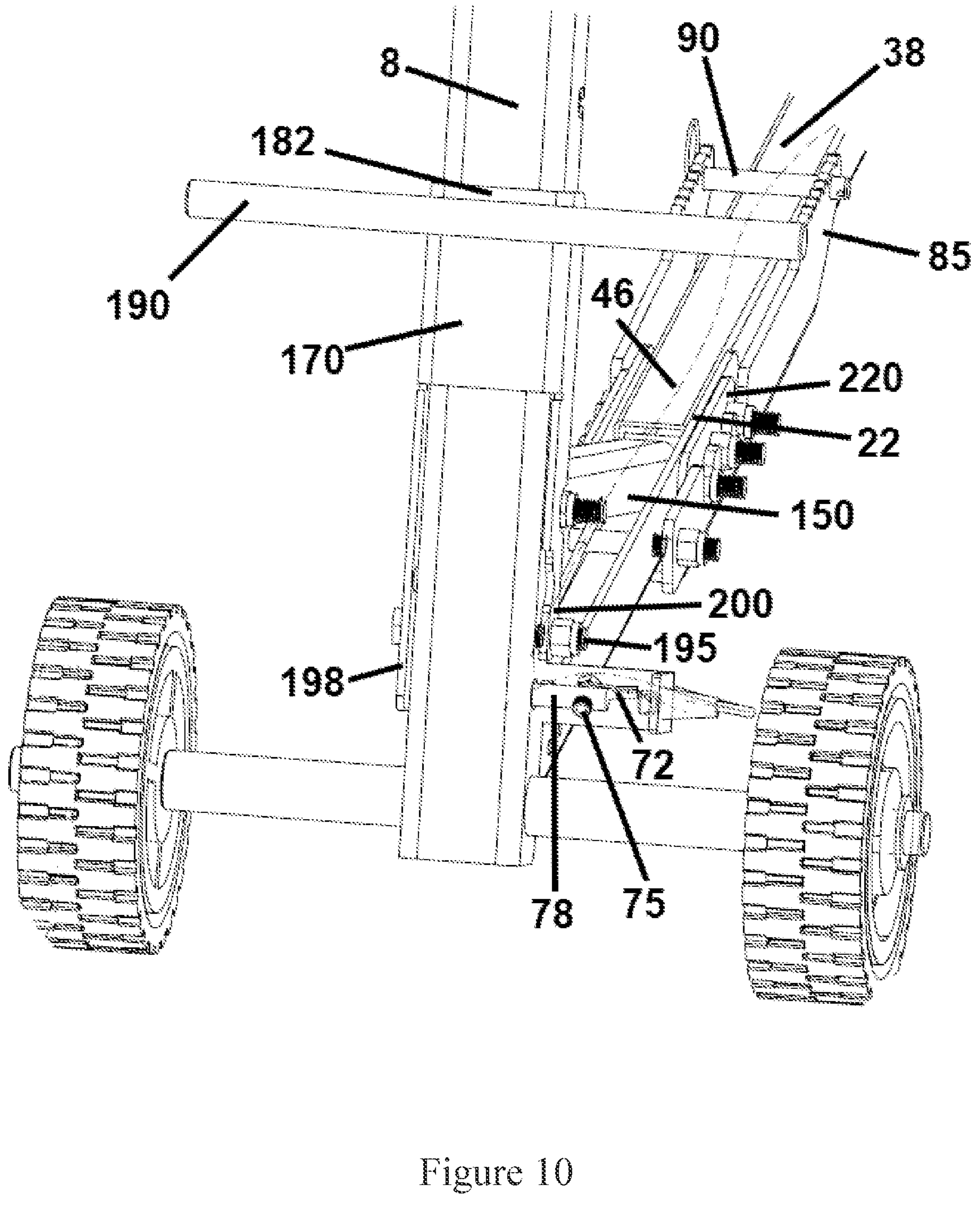
FIG. 10 is a front, perspective view of a lifting device, according to multiple embodiments and alternatives.
Figure 11:
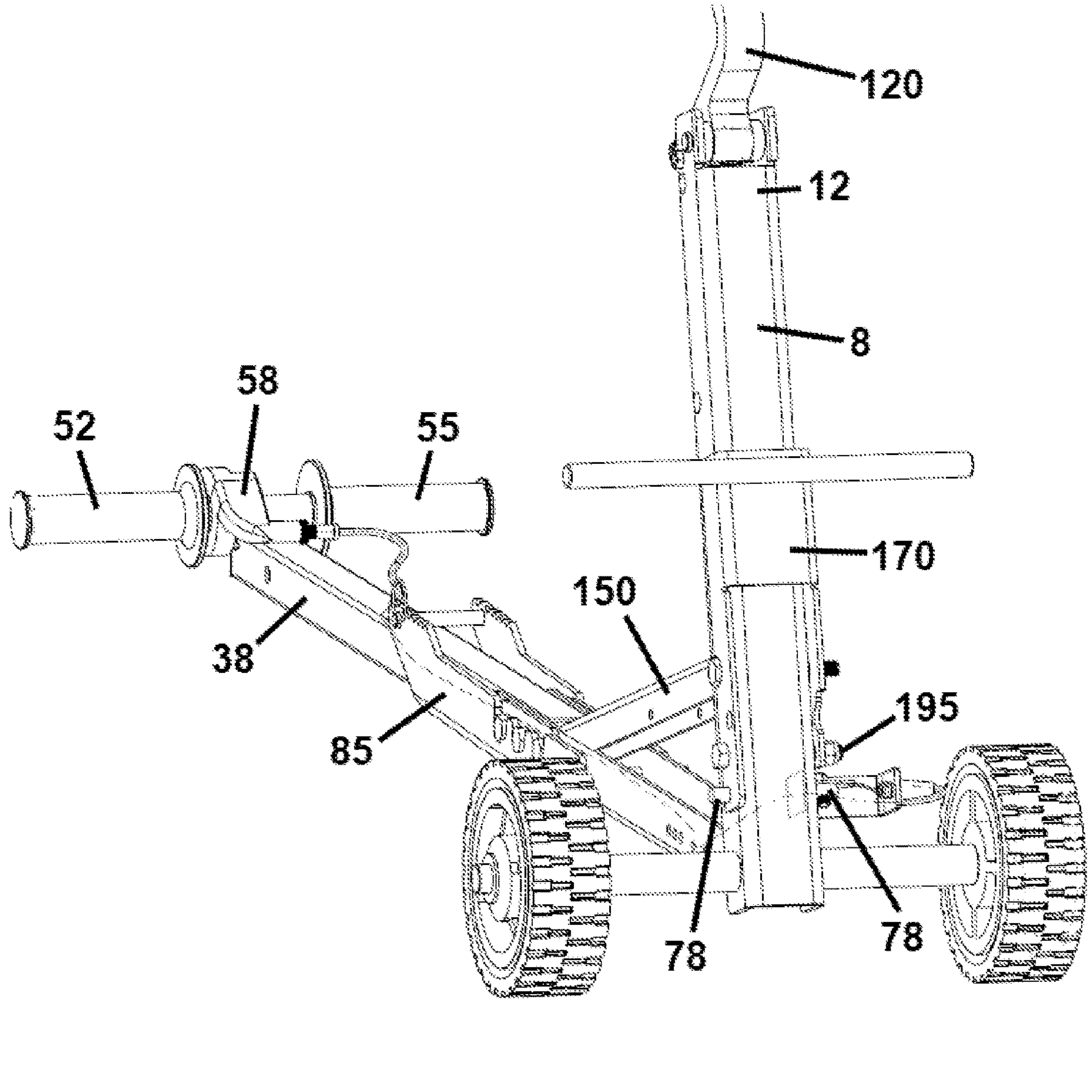
FIG. 11 is a front, perspective view of a lifting device, according to multiple embodiments and alternatives.

FIGS. 9-12B illustrate the interaction between release pin 78 and the rotation of the safety arm 170 about safety arm axis 195 and downwards along arrow 192 to engage the floor surface. In FIGS. 9 and 11, the release pin 78 is in the engaged position (in which release pin 78 extends fully through both the opposing side walls 19 of support element 8, through pin bore 68 of member 62, and through the first side wall 198 of safety arm 170). In FIGS. 10 and 12A, the user has actuated lever 58 in the handle 48, thereby causing the cable to pull release pin 78 inwards such that it is positioned in between the opposing side walls 19 of support element and release pin 78 is no longer engaged with the first side wall 198 of safety arm 170 (i.e. the dis-engaged position). As illustrated in FIG. 10, in some embodiments, a rectangular member 220 is positioned between the distal end 28 of vertical element 22 and the first end 46 of the handle extension 38.

Figure 12C:
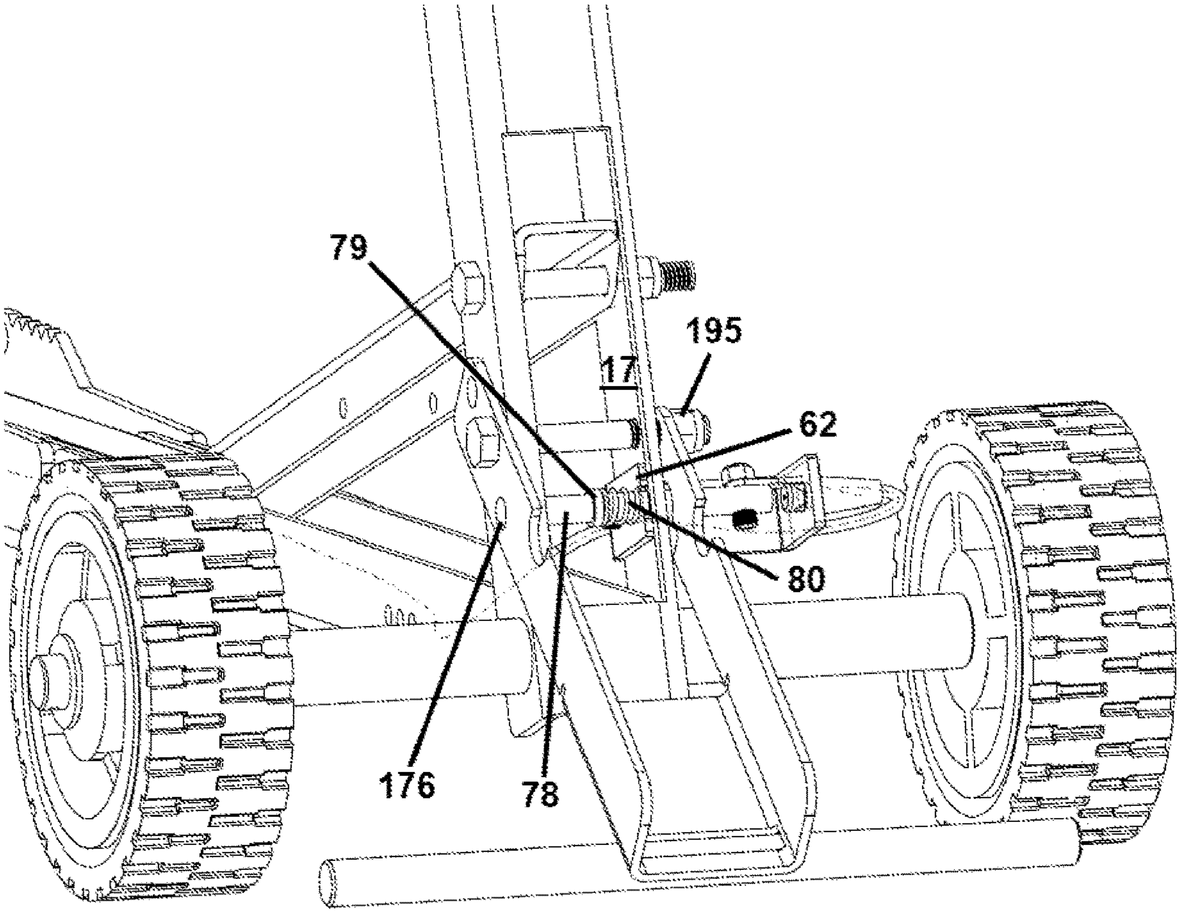
FIG. 12C is a front, perspective view of a lifting device with an extended safety arm and illustrates a cut-away view of a support element, according to multiple embodiments and alternatives.
Figure 12D:
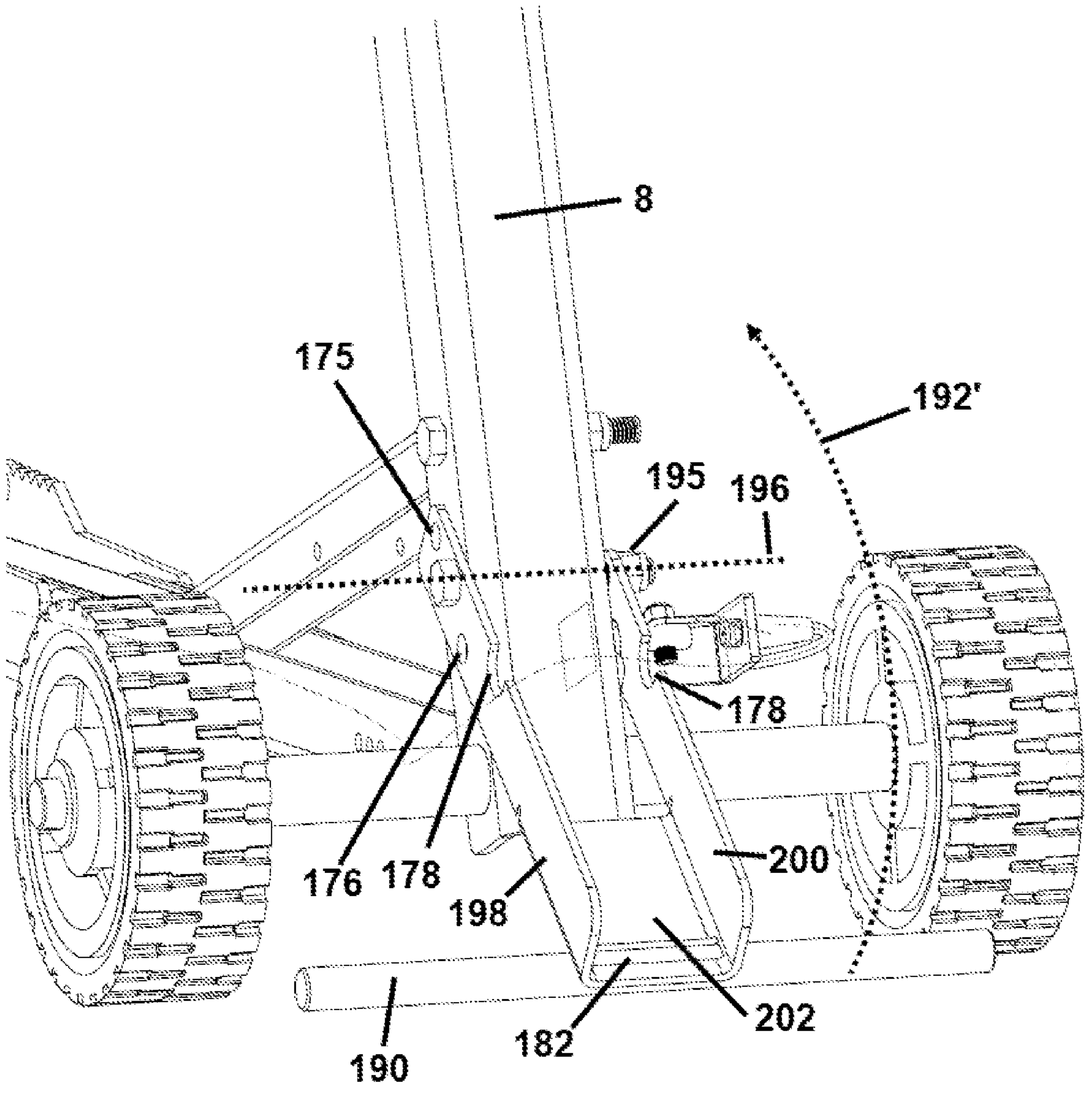
FIG. 12D is a front, perspective view of a lifting device with an extended safety arm, according to multiple embodiments and alternatives.

Once release pin 78 is in the dis-engaged position (shown in FIG. 12A), in some embodiments the weight of safety arm 170 causes safety arm 170 to rotate about safety arm axis 195 and travel downward along arrow 192 until bar 190 engages the floor surface (shown in FIGS. 12B-12D). Alternatively, in some embodiments an electric motor, hydraulics, one or more gas shocks, and/or one or more springs cause safety arm 170 to rotate and engage the floor. It will be appreciated by one or ordinary skill in the art that further mechanisms may be utilized to rotate safety arm 170. FIGS. 12A-D illustrate the first sidewall 198 and second sidewall 200 of the safety arm 170, wherein the first sidewall 198 is longer in length than the second sidewall 200. Both sidewalls 198, 200 define a groove 178 which is adapted to receive the nut and bolt that secures the brace element 150 to the support element 8. The safety arm 170 has a first end 180 which is connected to support element 8 and an opposing, distal end 182. Adjacent to the distal end 182, a connecting wall 202 spans between the first sidewall 198 and the second sidewall 200. In some embodiments, connecting wall 202 only spans a certain length downwards toward the first end 180, and this length may end before the grooves 178. Bar 190 is securely attached to wall 202 and is positioned adjacent to the distal end 182. The first sidewall 198 defines a first release pin receiving bore 175 that receives the release pin 78 when the safety arm 170 is in the closed position (see FIG. 8A). Likewise, the first sidewall further defines a second release pin receiving bore 176 that receives the release pin 78 when the safety arm 170 is in the extended position (see FIG. 12B). As shown in FIG. 12B, it will be appreciated that when safety arm 170 is secured in the extended position by the engagement of release pin 78 in the second release pin receiving bore 176, the safety arm 170 provides additional stability when the lifting device 5 is lifting up a piece of lawn mowing equipment.

FIG. 12C provides a cut-away view of support element 8 and illustrates the force provided by spring 80 which biases the release pin 78 towards engagement with the safety arm 170 in the closed and extended positions. When maintenance on the lawn mowing equipment is complete and safety arm 170 is no longer needed, a user can actuate the lever 58 to pull release pin 78 inwardly such that it is no longer received within the second release pin receiving bore 176 (see FIG. 12C). A user can then rotate handle 48 upwards towards the vertical position, thereby moving safety arm 170 internally about safety arm axis 196 and along arrow 192'. When the lawn mowing equipment is no longer engaged with lifting device 5, a user can continue rotating safety arm 170 internally about safety arm axis 196 until the safety arm 170 returns to the closed position. Once the first release pin receiving bore 175 is aligned with the release pin receiving bores 20 of the support element 8, the biasing force provided by spring 80 causes the release pin 78 to be received within the first release pin receiving bore 175 and secures safety arm 170 in the closed position, as shown in FIG. 11.

Figure 13:
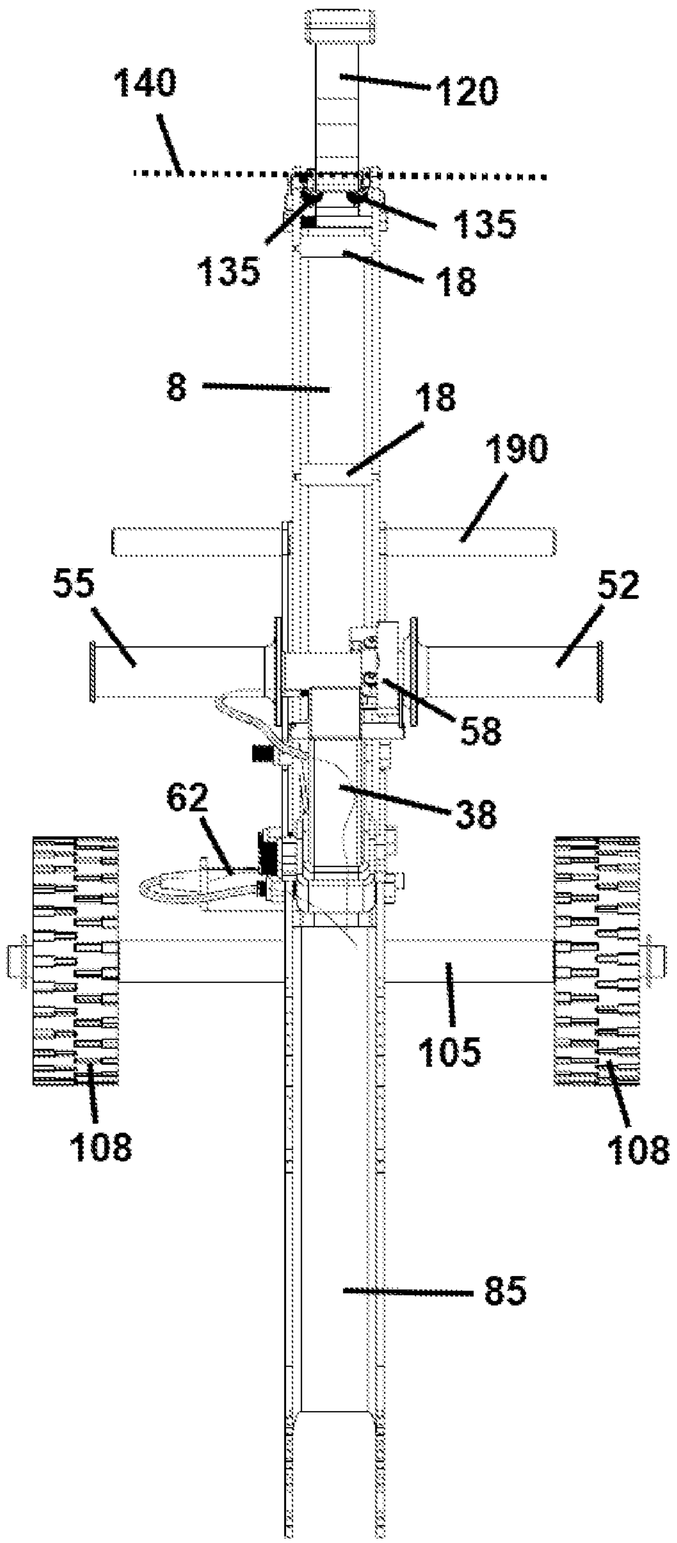
FIG. 13 is a rear view of a lifting device with an extended foot assist bar from the perspective of a user, according to multiple embodiments and alternatives.

FIG. 13 illustrates lifting device 5 from the perspective of the user. In FIG. 13, the pair of springs 135 are connected to tooth 120, which is rotatably connected to support element 8 about tooth axis 140. In some embodiments, support rods 18 are positioned between the opposing side walls 19 of the support element 8. In FIG. 13, safety arm 170 is secured to support element 8, and foot assist bar 85 is shown in the extended position.

In operation, starting from the vertical position (shown in FIG. 3A), lifting device 5 is rolled until it is adjacent to the lawn mowing equipment ready to be serviced. The tooth 120, rotatably connected to the distal end 12 of support element 8, is extended until it comes into contact with the lower edge of the lawn mowing equipment. Using wheels 108, the user then positions tooth 120 such that it receives the lower edge of the lawn mowing equipment within the lower end 125 of tooth 120 and the lower edge contacts pad 128. The user then rotates the handle 48 downwards, which moves the axle 105 and the wheels 108 forward (shown in FIG. 4A). As handle extension 38 and vertical element 22 rotate to the horizontal position (shown in FIG. 4A), the lawn mowing equipment continues to be raised. If additional force is needed for raising the lawn mowing equipment, a user can remove safety pin 90 and rotate foot assist bar 85 along arrow 102 (shown in FIG. 3A) to the extended position (shown in FIG. 3B), and apply pressure to foot assist bar 85 using the user's foot. Once handle extension 38 and vertical element 22 are generally in a horizontal position (shown in FIG. 4A), the user can release safety arm 170 by simply turning rotating handle grip 52 along arrow 53 (shown in FIG. 5). As previously noted, the rotation of handle grip 52 causes lever 58 to pull cable 60, which in turn moves release pin 78 to move inwardly from being engaged with the first release pin receiving bore 175 of safety arm 170 (shown in FIG. 8A) to the dis-engaged position where release pin 78 is no longer received in the first release pin receiving bore 175 (shown in FIG. 8B). Once release pin 78 is dis-engaged from the first release pin receiving bore 175, the weight of safety arm 170 and gravity cause safety arm 170 to rotate downwards along arrow 192 and engage the floor. When safety arm 170 is in the extended position, the bias applied by spring 80 causes the release pin 78 to be received in the second release pin receiving bore 176 of the safety arm 170 (as shown in FIG. 12B). Accordingly, when safety arm 170 is secured in the extended position by the release pin 78 and the safety arm 170 engages the floor surface, the lifting device 5 safely jacks up the lawn mown mowing equipment and secures the equipment in position. Once the maintenance is complete, the user rotates handle grip 52 to retract release pin 78 from the second release pin receiving bore 176 of the safety arm (as shown in FIG. 12C). The user rotates handle 48 upwards which slowly lowers the lawn mowing equipment and which retracts safety arm 170 along arrow 192' (shown in FIG. 12D). When the lawn mowing equipment is fully lowered, the user can roll lifting device 5 until it no longer is engaged with the lawn mowing equipment. The user can then fully retract safety arm 170 along arrow 192' until the bias applied by spring 80 causes the release pin 78 to be received within the first release pin receiving bore 175 and the safety arm 170 is thereby secured in the closed position. The user can then store the lifting device 5 in the vertical position.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways.

Also, it is to be understood that words and phrases used herein are for the purpose of description and should not be regarded as limiting. The use herein of "including," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A lifting device for lifting equipment, comprising:

an axle and a pair of wheels positioned on said axle;

a support element having a first end, an opposing distal end, a lower section positioned adjacent to said first end, and an outside surface, wherein the first end of the support element is secured to the axle;

a vertical element having a first end and an opposing distal end, wherein the first end is secured to the axle at an angle relative to the support element;

a handle having a lever, said handle being attached to the distal end of the vertical element;

a safety arm rotatably connected to the lower section of the support element by a hinge, said hinge defining a safety arm axis; and a release pin connected to the safety arm and the support element, wherein the release pin is mechanically connected to the lever by a cable;

wherein the release pin secures the safety arm in a closed position, wherein in the closed position the safety arm extends towards the distal end of said support element and is secured to said safety arm;

wherein actuation of the lever disengages the release pin from the safety arm and the safety arm rotates about the safety arm axis from the closed position to an extended position away from the support element;

wherein the handle further comprises a handle bar which receives a rotating handle grip, said rotating handle grip being rotatably connected about the handle bar and being mechanically connected to said lever;

wherein rotation of said rotating handle grip actuates said lever.

2. The lifting device of claim 1, wherein the safety arm further comprises a first sidewall and an opposing second sidewall being shorter in length then said first sidewall, wherein an end of the first sidewall defines a first release pin receiving bore;

wherein the lower section of the support element defines a pair of release pin receiving bores, wherein the release pin is received in the first release pin receiving bore of the first sidewall of the safety arm and the pair of release pin receiving bores of the support element;

wherein actuation of the lever causes the cable to pull the release pin inwardly; and wherein the safety arm rotates from the closed position to the extended position when the lever is actuated and the release pin is not engaged with the first release pin receiving bore of the first sidewall.

3. The lifting device of claim 2, wherein the safety arm further comprises a connecting wall spanning between the first sidewall and the second sidewall;

wherein the connecting wall mates with the outside surface of the support element when the safety arm is in the closed position;

wherein a bar is attached to the connecting wall and said bar is positioned adjacent to a distal end of said safety arm; and wherein the bar engages the floor when the safety arm is in the extended position.

4. The lifting device of claim 3, wherein the first sidewall of the safety arm further defines a second release pin receiving bore positioned distal to the first release pin receiving bore;

wherein the release pin is received in the second release pin receiving bore of the first sidewall of the safety arm and the pair of release pin receiving bores of the support element when the safety arm is in the extended position; and wherein to retract the safety arm from the extended position to the closed position, the release pin is disengaged from the second release pin receiving bore by the actuation of the lever.

5. The lifting device of claim 2, wherein the support element further comprises a first sidewall and an opposing, second sidewall, said first and second sidewalls defining the pair of release pin receiving bores in the lower section of said support element;

the release pin having a first end and an opposing second end, wherein the first end defines a shoulder;

wherein a spring is positioned about said release pin, wherein an end of the spring engages an inside surface of the first sidewall of the support element and an opposing end of the spring engages the shoulder of the release pin such that said spring applies a force opposing the inward movement of said release pin.

6. The lifting device of claim 5, further comprising a member having a first wall, an opposing second wall, and a connecting wall spanning between the first wall and the second wall, wherein the first wall defines a guide bore adapted to receive a first cable guide and the cable, and the second wall defines a pin bore adapted to receive the release pin;

wherein the second wall of the member is attached to an external surface of the first sidewall of said support element and positioned proximal to said release pin receiving bore of said first sidewall of said support element.

7. The lifting device of claim 6, wherein the first cable guide is connected to an outside surface of the first wall of said member and the first cable guide receives said cable;

wherein a second cable guide is positioned between the first and second walls of said member, said second cable guide receives said cable and is connected to the second end of the release pin by a clamp.

8. The lifting device of claim 1, wherein the release pin secures the safety arm in the extended position.

9. The lifting device of claim 1, wherein the angle between the vertical element and the support element is between about 60° to 90°.

10. A lifting device for lifting equipment, comprising:

an axle having a first end and a second end, the axle further comprising a first wheel attached to the first end and a second wheel attached to the second end;

a support element having a first end, an opposing distal end, a lower section positioned adjacent to said first end of said support element, a first sidewall and an opposing second sidewall, and a connecting wall spanning between the first sidewall and the second sidewall, said connecting wall defining an outside surface of the support element, wherein the first end of the support element is secured to the axle in between the first and second wheels, said first and second sidewalls defining a pair of release pin receiving bores in the lower section of said support element;

a vertical element having a first end and an opposing distal end, wherein the first end is secured to the axle in between the first and second wheels, wherein the vertical element is attached to the axle at an angle relative to the support element;

a handle attached to the distal end of the vertical element, wherein the handle comprises a handle bar which receives a rotating handle grip, said rotating handle grip being rotatably connected about the handle bar and being mechanically connected to a lever, wherein rotation of said rotating handle grip actuates said lever;

a safety arm having a first end, an opposing distal end, a first sidewall, an opposing second sidewall being shorter in length then said first sidewall of said safety arm, and a connecting wall spanning between the first sidewall and the second sidewall of said safety arm, said connecting wall having an inside surface and an outside surface, wherein the first end of the safety arm is rotatably connected to the lower section of the support element by a hinge, said hinge defining a safety arm axis, wherein an end of the first sidewall of the safety arm defines a first release pin receiving bore, wherein the first sidewall of the safety arm further defines a second release pin receiving bore positioned distal to said first release pin receiving bore, a wherein a bar is attached to the outside surface of the connecting wall of the safety arm and said bar is positioned adjacent to the distal end of said safety arm;

a release pin securing the safety arm in a closed position wherein the safety arm extends towards the distal end of said support element, the inside surface of the connecting wall of the safety arm engages the outside surface of the support element, and the safety arm is secured to said support element; wherein in the closed position the release pin is positioned within the pair of release pin receiving bores of said support element and the first release pin receiving bore of said safety arm; wherein the release pin is mechanically connected to the lever by a cable; wherein actuation of the lever causes the cable to pull the release pin inwardly, wherein the safety arm rotates from the closed position to an extended position away from the support element when the lever is actuated and the release pin is not engaged with the first release pin receiving bore of the first sidewall of the safety arm, wherein in the extended position the bar of the safety arm engages the floor and the release pin is positioned within the pair of release pin receiving bores of said support element and the second release pin receiving bore of said safety arm to secure the safety arm in the extended position; wherein to retract the safety arm from the extended position to the closed position, the release pin is disengaged from the second release pin receiving bore by the actuation of the lever;

a tooth having an upper end, a lower end, an inside surface, and an outside surface, wherein the upper end of the tooth comprises an extension and the lower end of the tooth comprises a rounded element integrally connected to said upper end, wherein the inside surface of the lower end of the tooth is adapted to receive a piece of equipment, wherein a protrusion is positioned on the outside surface of the tooth and adjacent to the upper end of the tooth, said protrusion defining a hinge receiving bore adapted to receive a second hinge, wherein the protrusion is received between the connecting wall, the first sidewall, and the second sidewall of the distal end of the support element, wherein the tooth is rotatably connected to the distal end of the support element by the second hinge, said second hinge defining a tooth axis; and a first spring and a second spring, wherein the first spring is secured to the upper end of the tooth and the distal end of the first sidewall of the support element, wherein the second spring is secured to the upper end of the tooth and the distal end of the second sidewall of the support element.

11. The lifting device of claim 10, further comprising a brace element spanning between the lower section of the support element and the vertical element.

12. The lifting device of claim 10, further comprising a foot assist bar rotatably connected to said vertical element, wherein the foot assist bar is secured to the vertical element by a safety pin.

13. The lifting device of claim 10, wherein the angle between the vertical element and the support element is between about 60° to 90°.

14. The lifting device of claim 10, further comprising a member having a first wall, an opposing second wall, and a connecting wall spanning between the first wall and the second wall, wherein the first wall defines a guide bore adapted to receive a first cable guide and the cable, and the second wall defines a pin bore adapted to receive the release pin;

wherein the second wall of the member is attached to an internal surface of the first sidewall of said support element and positioned proximal to said release pin receiving bore of said first sidewall of said support element;

wherein the first cable guide is connected to an outside surface of the first wall of said member and the first cable guide receives said cable;

wherein a second cable guide is positioned between the first wall of said member and an external surface of the first sidewall of said support element, said second cable guide receives said cable and is connected to the second end of the release pin by a clamp.

15. A lifting device for lifting equipment, comprising:

an axle and a pair of wheels positioned on said axle;

a support element having a first end, an opposing distal end, a lower section positioned adjacent to said first end, and an outside surface, wherein the first end of the support element is secured to the axle;

a vertical element having a first end and an opposing distal end, wherein the first end is secured to the axle at an angle relative to the support element;

a handle having a lever, said handle being attached to the distal end of the vertical element;

a safety arm rotatably connected to the lower section of the support element by a hinge, said hinge defining a safety arm axis; and a release pin connected to the safety arm and the support element, wherein the release pin is mechanically connected to the lever by a cable;

wherein the release pin secures the safety arm in a closed position, wherein in the closed position the safety arm extends towards the distal end of said support element and is secured to said safety arm;

wherein actuation of the lever disengages the release pin from the safety arm and the safety arm rotates about the safety arm axis from the closed position to an extended position away from the support element;

wherein the safety arm further comprises a first sidewall and an opposing second sidewall being shorter in length then said first sidewall, wherein an end of the first sidewall defines a first release pin receiving bore;

wherein the lower section of the support element defines a pair of release pin receiving bores, wherein the release pin is received in the first release pin receiving bore of the first sidewall of the safety arm and the pair of release pin receiving bores of the support element;

wherein actuation of the lever causes the cable to pull the release pin inwardly; and wherein the safety arm rotates from the closed position to the extended position when the lever is actuated and the release pin is not engaged with the first release pin receiving bore of the first sidewall.

* * * * *